United States Patent
Shimojoh et al.

(10) Patent No.: US 6,344,914 B1
(45) Date of Patent: Feb. 5, 2002

(54) GAIN EQUALIZER WHICH INCLUDES A PLURALITY OF OPTICAL FILTERS FOR EQUALIZING THE GAIN OF AN OPTICAL AMPLIFIER

(75) Inventors: Naomasa Shimojoh; Takafumi Terahara; Terumi Chikama, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/805,825

(22) Filed: Feb. 26, 1997

(30) Foreign Application Priority Data

Mar. 7, 1996 (JP) ............................... 8-050654

(51) Int. Cl.$^7$ ..................... H04B 10/02; H04B 10/00; H01S 3/00
(52) U.S. Cl. ..................... 359/177; 359/177; 359/161; 359/341
(58) Field of Search ................. 359/124, 134, 359/160, 161, 341, 177

(56) References Cited

U.S. PATENT DOCUMENTS

| | | | | |
|---|---|---|---|---|
| 5,225,922 A | * | 7/1993 | Chraplyvy et al. | 359/124 |
| 5,365,362 A | * | 11/1994 | Gnauck et al. | 359/174 |
| 5,392,147 A | | 2/1995 | Kaede et al. | 359/181 |
| 5,406,404 A | * | 4/1995 | DiGiovanni et al. | 359/161 |
| 5,436,760 A | * | 7/1995 | Nakabayashi | 359/341 |
| 5,539,557 A | | 7/1996 | Horiuchi et al. | 359/110 |
| 5,583,689 A | | 12/1996 | Cassidy et al. | 359/341 |
| 5,696,615 A | * | 12/1997 | Alexander | 359/134 |
| 5,748,814 A | | 5/1998 | Painchaud et al. | 385/37 |

FOREIGN PATENT DOCUMENTS

| | | | |
|---|---|---|---|
| JP | 6-276154 | | 3/1993 |
| JP | 062276154 | * | 3/1993 |
| WO | WO 93/24977 | | 9/1993 |

OTHER PUBLICATIONS

Willner A. E. et al., "Passive Equalization of Nonuniform EDFA Gain by Optical Filtering for Megameter Transmission of 20 WDM Channels Through a Cascade of EDFA'S", IEEE Photonics Technology Letters, vol. 5, No. 9, Sep. 1, 1993, pp. 1023–1026.

Arkwright, et al., "Custom designed gain-flattening filters with highly reproducible spectral characteristics", OSA Trends in Optics and Photonics Series, vol. 30, pp. 147–150, Jun. 9–11, 1999 Optical Society of America.

* cited by examiner

*Primary Examiner*—Jason Chan
*Assistant Examiner*—Mohammad Sedighian
(74) *Attorney, Agent, or Firm*—Staas & Halsey LLP

(57) ABSTRACT

A gain equalizer which equalizes gain versus wavelength characteristics of an optical amplifier. The gain versus wavelength characteristics of the optical amplifier include first, second and third gain peaks in a wavelength band with the second gain peak being between the first and third gain peaks. The optical amplifier amplifies an input signal in accordance with the gain versus wavelength characteristics to produce an output signal. The gain equalizer includes first, second and third optical filters having first, second and third transparency characteristics, respectively. The first, second and third transparency characteristics are periodic waveforms having different periods related to the wavelength difference between the first and third gain peaks. The second transparency characteristic is a periodic waveform having a period equal to $1/(2^n)$ of the period of the waveform of the first transparency characteristic. The third transparency characteristic is a periodic waveform having a period equal to ¼ of the period of the waveform of the first transparency characteristic. For example, the first transparency characteristic is a periodic waveform with ¼ period extending between the first and third gain peaks, the second transparency characteristic is a periodic waveform with one period extending between the first and third gain peaks, and the third transparency characteristic is a periodic waveform with two periods extending between the first and third gain peaks.

56 Claims, 16 Drawing Sheets

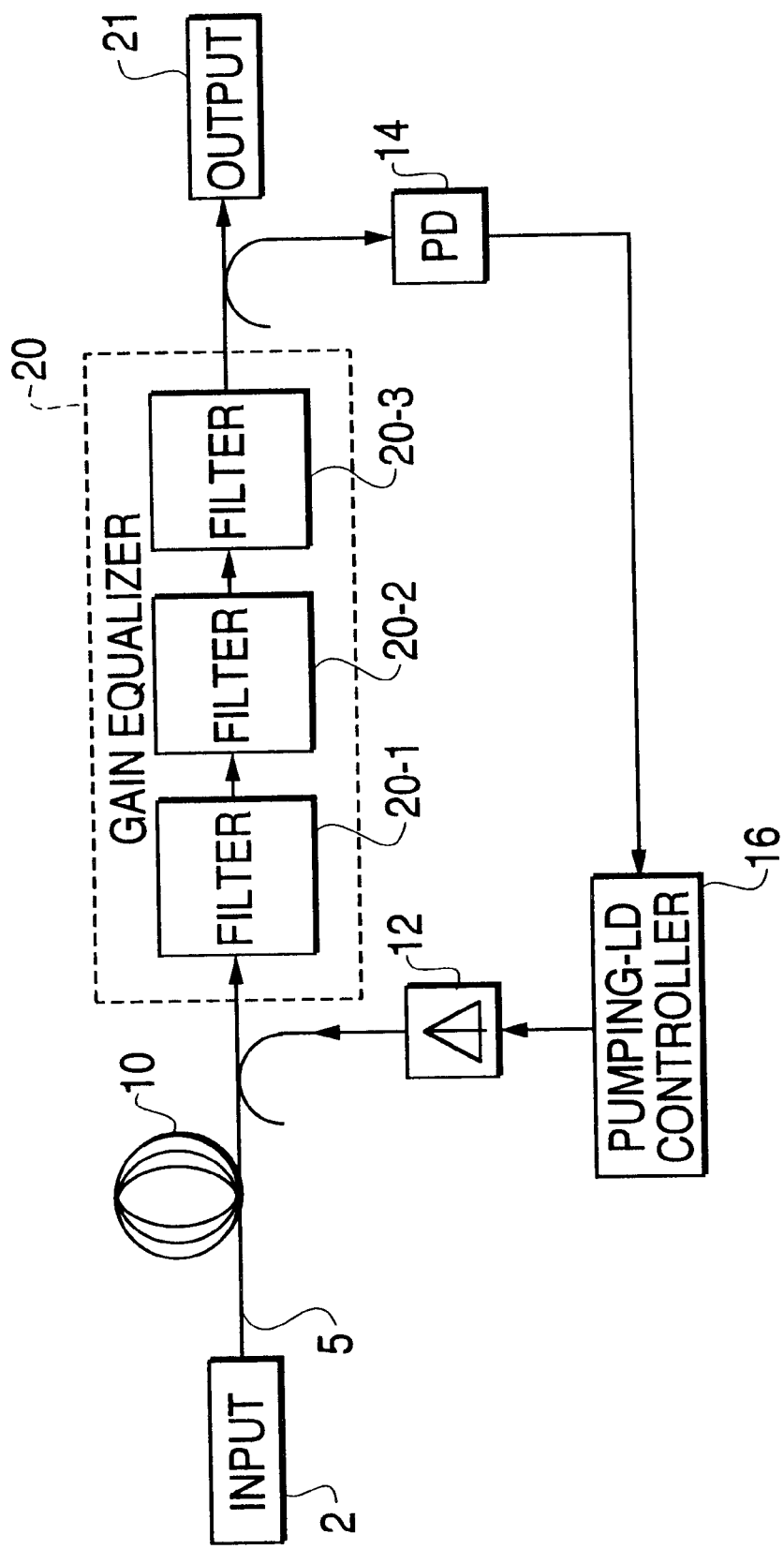

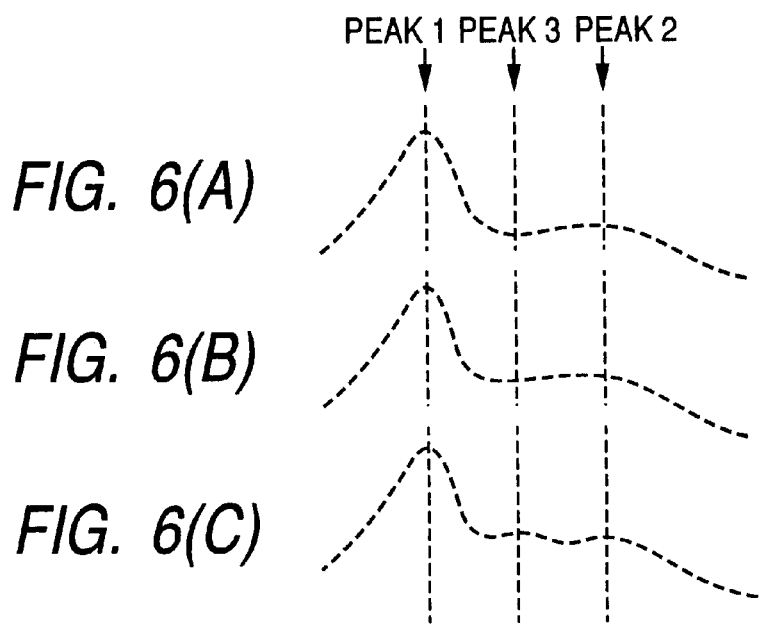
FIG. 6(A)
FIG. 6(B)
FIG. 6(C)
FIG. 7
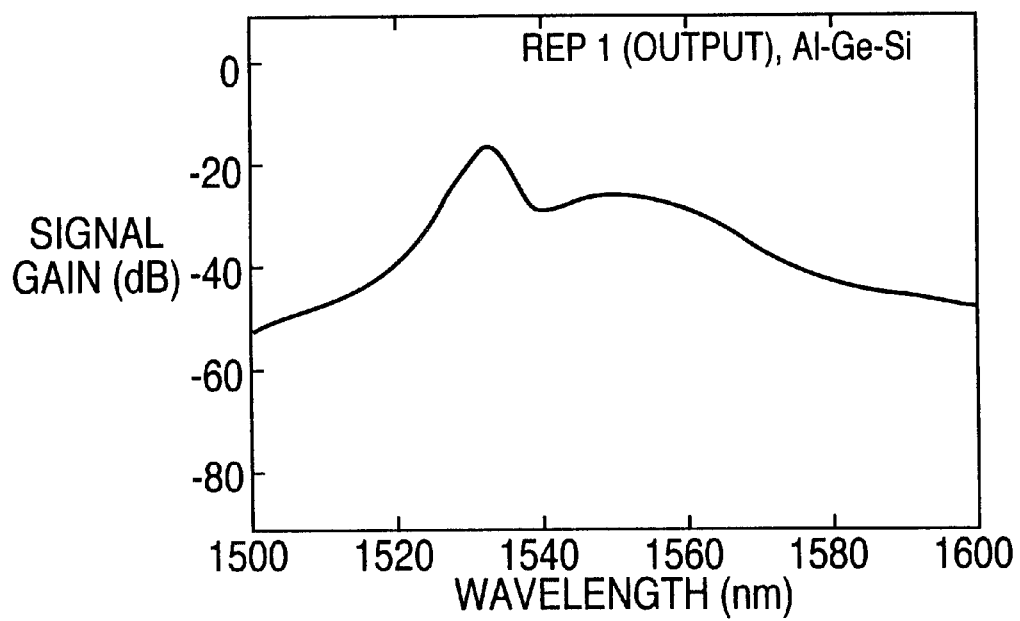

GAIN EQUALIZER WHICH INCLUDES A PLURALITY OF OPTICAL FILTERS FOR EQUALIZING THE GAIN OF AN OPTICAL AMPLIFIER

CROSS-REFERENCE TO RELATED APPLICATIONS

This application is based on, and claims priority to, Japanese application number 08-050654, filed on Mar. 7, 1996, in Japan, and which is incorporated herein by reference.

BACKGROUND OF THE INVENTION

1. Field of the Invention

The present invention relates to a gain equalizer for equalizing the gain of an optical amplifier. More particularly, the present invention relates to a gain equalizer which includes a plurality of optical filters with transparency characteristics represented by periodic waveforms having different periods.

2. Description of the Related Art

FIG. 1 is a diagram illustrating a conventional optical communication system which uses wavelength division multiplexing (WDM) to increase the transmission capacity of the system. Referring now to FIG. 1, a plurality of optical sending stations (OS) 1000#1 to 1000 #n produce individual signals having different wavelengths of $\lambda 1$ to $\lambda n$, respectively, where n is an integer. The individual signals are provided to a multiplexer (MUX) 1002 which multiplexes the individual signals together into a single WDM signal provided to a transmission line 1004. Transmission line 1004 is often a single optical fiber.

The WDM signal propagates through transmission line 1004 and is received by a demultiplexer (DEMUX) 1006. Demultiplexer 1006 demultiplexes the WDM signal light back into individual signals having different wavelengths of $\lambda 1$ to $\lambda n$, respectively. Each individual signal is then provided to a corresponding optical receiving station (OR) 1008#1 to 1008#n.

When transmission line 1004 is relatively long (that is, the WDM signal is to be transmitted over a long distance), a plurality of repeaters 1012 must be inserted into transmission line 1004 to amplify the WDM signal as the WDM signal travels through transmission line 1004. A repeater is typically referred to as a "submarine" repeater when it is for use underwater in a transmission line extending, for example, between continents.

Each repeater 1012 typically includes an optical amplifier 1014, which is often an erbium-doped fiber amplifier (EDFA), to amplify the WDM signal. Generally, an EDFA uses an erbium-doped fiber (EDF) as an amplifying medium. As the WDM signal travels through the EDF, pump light is provided to the EDF from a pump light source (not illustrated) so that the pump light interacts with, and thereby amplifies, the WDM signal.

An EDFA has gain versus wavelength characteristics based on the composition of an optical fiber base material used to make the EDF. These gain versus wavelength characteristics are not perfectly flat in a wavelength band of 1.5 to 1.6 $\mu$m, the band generally used for long distance optical transmission. Therefore, an EDFA typically experiences an undesirable "gain tilt", where the individual signals in the WDM signal are amplified with different gains, depending on the power of the pump light. For example, when the power of the pump light is relatively high, the EDFA may produce a negative gain tilt, where higher wavelength components in the WDM signal are amplified less than lower wavelength components in the WDM signal. Similarly, when the power of the pump light is relatively low, the EDFA may produce a positive gain tilt, where higher wavelength components in the WDM signal are amplified more than lower wavelength components in the WDM signal. Thus, the gain tilt of an EDFA may not be flat.

When a transmission line extends for a relatively long distance (such as, for example, between continents), it is usually necessary to insert tens of stages of submarine repeaters in series into the transmission line. Therefore, the WDM signal will be amplified by tens of stages of optical amplifiers in series. Unfortunately, when a WDM signal is transmitted through tens of stages of optical amplifiers, the cumulative effect of gain tilt in the optical amplifiers will cause dispersion of optical signal-to-noise ratios (SNRs) of the individual signals in the WDM signal. Such dispersion will result in a low optical SNR which will be further degraded in each subsequent repeater.

For example, FIG. 2(A) is a graph illustrating an optical spectrum waveform where a WDM signal is conventionally transmitted through ten (10) repeaters in series, and FIG. 2(B) is a graph illustrating an optical spectrum waveform where a WDM signal is conventionally transmitted through sixty (60) repeaters in series. In both cases, an Al-low-density (less than 1 Wt %) EDF is used, and the WDM signal includes four individual signals at different wavelengths multiplexed together.

As shown in FIG. 2(A), in the case of ten (10) repeaters in series, the dispersion of optical SNR is relatively small. However, as shown in FIG. 2(B), in the case of sixty (60) repeaters in series, the dispersion of optical SNR is increased and thereby results in individual signals having an insufficient optical SNR.

Various methods have been proposed to compensate for the dispersion of optical SNR when a large number of repeaters are inserted into a transmission line. For example, one such proposed method is to use an Al-low-density (less than 1 Wt %) EDF and a Fabry-Perot etalon optical filter as a gain equalizer. See Takeda, et al., "Gain equalization of Er-doped fiber amplifier using etalon filter", a publication of autumn communication society by the Institute of Electronics, Information and Communication Engineers, 1995, B-759.

A second proposed method allows the transmission of twenty (20) waves on a 6300-km path using an Al-low-density EDF and a fiber grating filter as a gain equalizer. See, for example, N. S. Bergano et al., "100/Gb/s WDM Transmission of Twenty 5 Gb/s NRZ Data Channels Over Transoceanic Distances Using a Gain Flattened Amplifier Chain", Th. A. 3. 1, ECOC'95.

A third proposed method is to use a Mach-Zehnder-type gain equalizer with an Al-low-density optical amplifier. See Kazuhiro Oda et al., "16-Channel×10-Gbit/s Optical FDM Transmission Over a 1000 km Conventional Single-Mode Fiber Employing Dispersion-Compensating Fiber and Gain Equalization", OFC'95, PD22-1 to PD-22-5.

In each of the above-described proposed methods, generally, a gain equalizer has reverse transmission characteristics in relation to the amplifier characteristics of an EDFA. Thus, the gain equalizer compensates for the amplifier characteristics to produce a flatter amplifier gain in a narrow band, thereby obtaining a flat transmission band and reducing dispersion of optical SNR. The WDM signal is transmitted in the narrow band.

Generally, the narrow band is set as a 10 nm band of 1550 to 1560 nm. The narrow band is limited in size since, generally, the above-described proposed methods can only compensate for the gain of an EDFA around a single gain peak in the gain characteristics of the EDFA, or along a small portion of positive or negative gain slopes of the gain characteristics of the EDFA. Therefore, the narrow band for transmission allowed by the above-described proposed methods is too narrow to transmit a WDM signal which includes a relatively large number of individual signal lights.

SUMMARY OF THE INVENTION

Accordingly, it is an object of the present invention to provide a gain equalizer which will sufficiently flatten gain versus wavelength characteristics of an EDFA over a relatively large band when tens of repeaters are connected in series. Preferably, such a relatively large band can include, for example, several 10-nm bands of 1.53-$\mu$m band to 1.56-$\mu$m band.

Additional objects and advantages of the invention will be set forth in part in the description which follows, and, in part, will be obvious from the description, or may be learned by practice of the invention.

The foregoing objects of the present invention are achieved by providing an apparatus, such as a gain equalizer, for equalizing gain versus wavelength characteristics of an optical amplifier. The gain versus wavelength characteristics have first and second gain peaks in a wavelength band with a wavelength difference between the first and second gain peaks. The apparatus includes first and second optical filters connected to the optical amplifier and having first and second transparency characteristics, respectively. The first and second transparency characteristics are periodic waveforms having periods related to the wavelength difference between the first and second gain peaks. The period of the waveform of the first transparency characteristic is different from the period of the waveform of the second transparency characteristic.

Objects of the present invention are also achieved by providing an optical communication system which includes an optical amplifier and first and second optical filters. The optical amplifier has gain versus wavelength characteristics with first and second gain peaks in a wavelength band and a wavelength difference between the first and second gain peaks. The first and second optical filters have first and second transparency characteristics, respectively. The first and second transparency characteristics are periodic waveforms having periods related to the wavelength difference between the first and second gain peaks. The period of the waveform of the first transparency characteristic is different from the period of the waveform of the second transparency characteristic. The first and second optical filters each filter either an input signal to the optical amplifier or an output signal of the optical amplifier.

Objects of the present invention are also achieved by providing a method for equalizing gain versus wavelength characteristics of an optical amplifier which amplifies an input signal in accordance with the gain versus wavelength characteristics, to produce an output signal. The gain versus wavelength characteristics have first and second gain peaks in a wavelength band with a wavelength difference between the first and second gain peaks. The method includes the steps of (a) filtering either the input signal or the output signal with a first transparency characteristic, and (b) filtering either the input signal or the output signal with a second transparency characteristic. The first and second transparency characteristics are periodic waveforms having periods related to the wavelength difference between the first and second gain peaks. The period of the waveform of the first transparency characteristic is different from the period of the waveform of the second transparency characteristic.

Objects of the present invention are further achieved by providing an additional method for equalizing gain versus wavelength characteristics of an optical amplifier. The gain versus wavelength characteristics have first and second gain peaks in a wavelength band with a wavelength difference between the first and second gain peaks. The method includes the steps of (a) branching a light signal into first and second signals, (b) filtering the first signal with a first transparency characteristic, (c) filtering the second signal with a second transparency characteristic, and (d) combining the filtered first and second signals into a combined signal which is amplified by the optical amplifier. The first and second transparency characteristics are periodic waveforms having periods related to the wavelength difference between the first and second gain peaks. Moreover, the period of the waveform of the first transparency characteristic is different from the period of the waveform of the second transparency characteristic.

In addition, objects of the present invention are achieved by providing a method which includes the steps of (a) branching an output signal of an optical amplifier into first and second signals, (b) filtering the first signal with a first transparency characteristic, (c) filtering the second signal with a second transparency characteristic, and (d) combining the filtered first and second signals into a combined signal. As described above, the first and second transparency characteristics are periodic waveforms having periods related to the wavelength difference between first and second gain peaks of the gain versus wavelength characteristics of the optical amplifier. Moreover, the period of the waveform of the first transparency characteristic is different from the period of the waveform of the second transparency characteristic.

BRIEF DESCRIPTION OF THE DRAWINGS

Reference will now be made in detail to the preferred embodiments of the present invention, examples of which are illustrated in the accompanying drawings, wherein like reference numerals refer to like elements throughout.

FIG. 3 is a diagram illustrating a gain equalizer according to an embodiment of the present invention.

FIGS. 6(A), 6(B) and 6(C) are graphs illustrating amplifier characteristics of an EDFA for small, medium and large aluminum (Al) densities, respectively, according to an embodiment of the present invention.

FIG. 7 is a graph illustrating amplifier characteristics of an Al-low-density (less than 1 Wt %) EDFA, according to an embodiment of the present invention.

DESCRIPTION OF THE PREFERRED EMBODIMENTS

Figure 1:
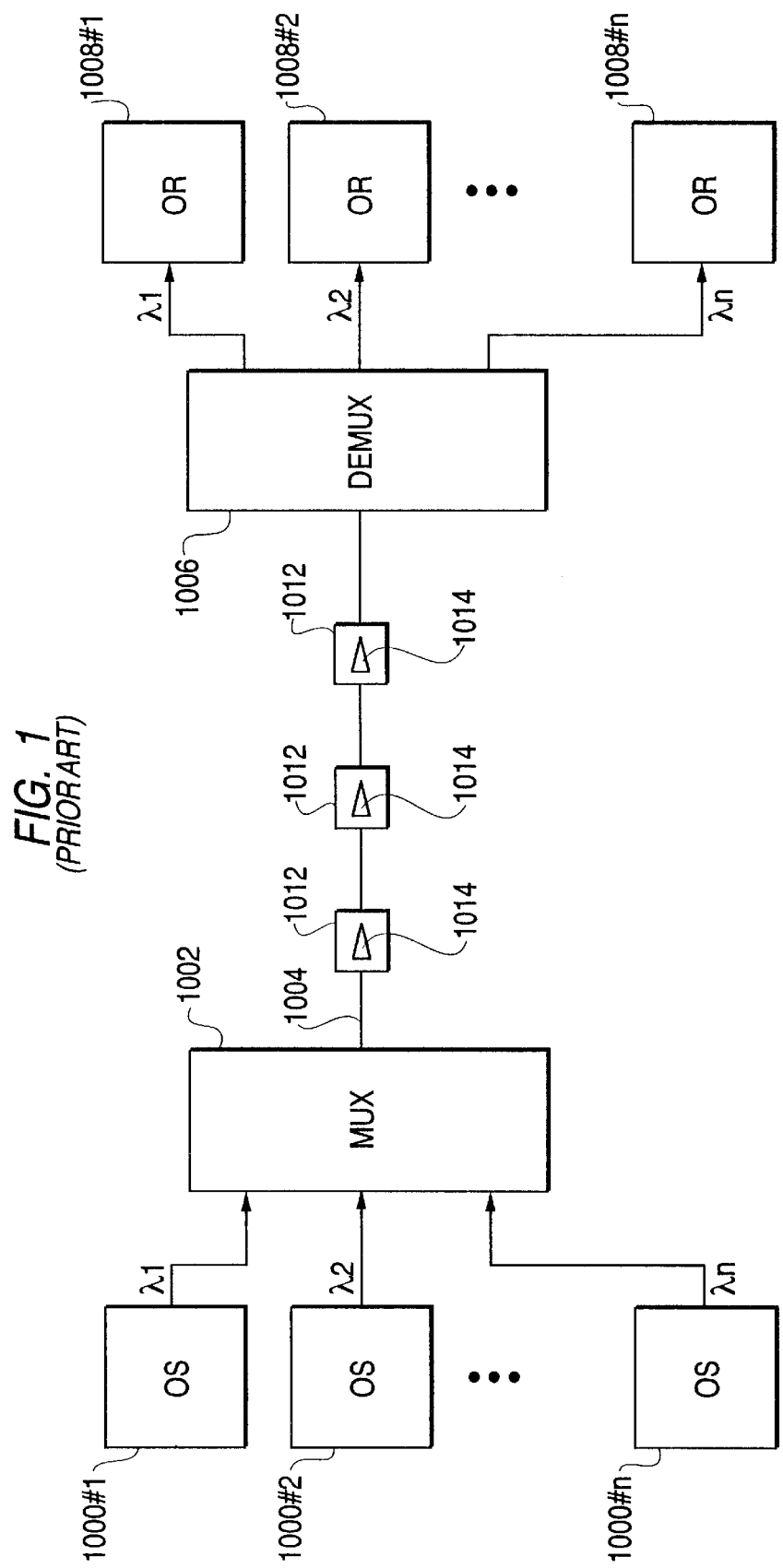
FIG. 1 (prior art), is a diagram illustrating a conventional optical communication system which uses wavelength division multiplexing (WDM) to increase the transmission capacity of the system.
Figure 2A:
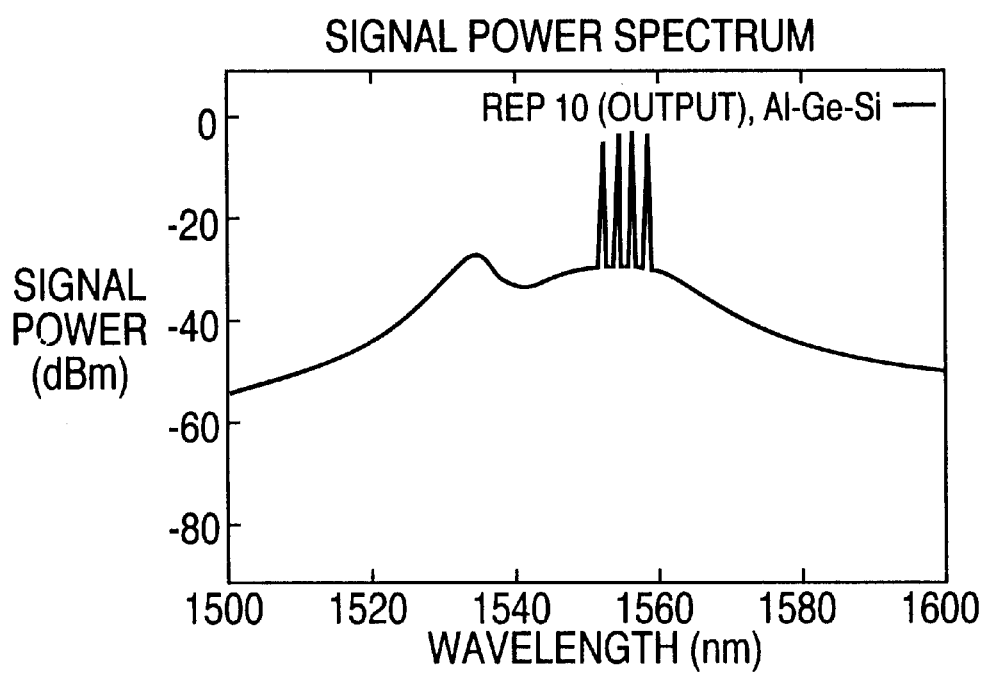
FIG. 2(A) is a graph illustrating an optical spectrum waveform where a WDM signal is conventionally transmitted through ten (10) repeaters in series.
Figure 2B:
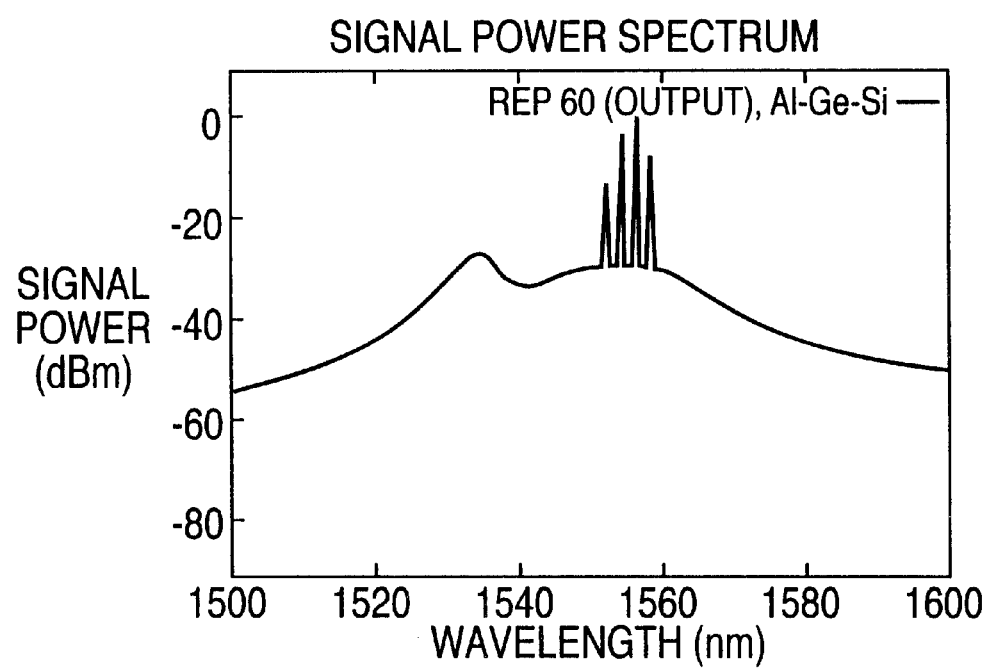
FIG. 2(B) is a graph illustrating an optical spectrum waveform where a WDM signal is conventionally transmitted through sixty (60) repeaters in series.

Reference will now be made in detail to the present preferred embodiments of the present invention, examples of which are illustrated in the accompanying drawings, wherein like reference numerals refer to like elements throughout.

FIG. 3 is a diagram illustrating a gain equalizer according to an embodiment of the present invention. Referring now to FIG. 3, a WDM signal is received at an input 2 of an optical transmission line 5 and is provided to an Al-high-density EDFA 10. Pump light produced by a pumping laser diode (LD) 12 is also provided to Al-high-density EDFA 10. The pump light interacts an EDF forming Al-high-density EDFA 10 to cause the WDM signal to be amplified as the WDM signal travels through Al-high-density EDFA 10. More specifically, the WDM signal travelling through Al-high-density EDFA 10 is amplified by energy provided from the pump light produced by laser diode 12.

The amplified WDM signal then travels through a gain equalizer 20 which equalizes the gain of Al-high-density EDFA 10. The equalized, amplified WDM signal is then provided to an output 21 of transmission line 5.

A portion of the amplified WDM signal light is decoupled from transmission line 5 and provided to a photo detector (PD) 14 to monitor characteristics of the amplified WDM signal. Based on the value of the monitored characteristics, a pumping-LD controller 16 controls output energy of laser diode 12 to fix the output power of the amplified WDM signal.

Gain equalizer 20 includes a plurality of optical filters 20-1, 20-2, and 20-3, connected in series, to equalize the amplifier characteristics of Al-high-density EDFA 10 over a wide wavelength band. Each optical filter 20-1, 20-2, and 20-3 is preferably a Fabry-Perot etalon filter, although the present invention is not intended to be limited to the use of Fabry-Perot etalon filters, and other types of filters may be appropriate. More specifically, any type of filter which provides appropriate filtering characteristics may be used as optical filters 20-1, 20-2 and 20-3.

Although FIG. 3 illustrates gain equalizer 20 as being positioned at the output side of Al-high-density EDFA 10, gain equalizer 20 can be positioned at the input side of Al-high-density EDFA 10.

Figure 4:
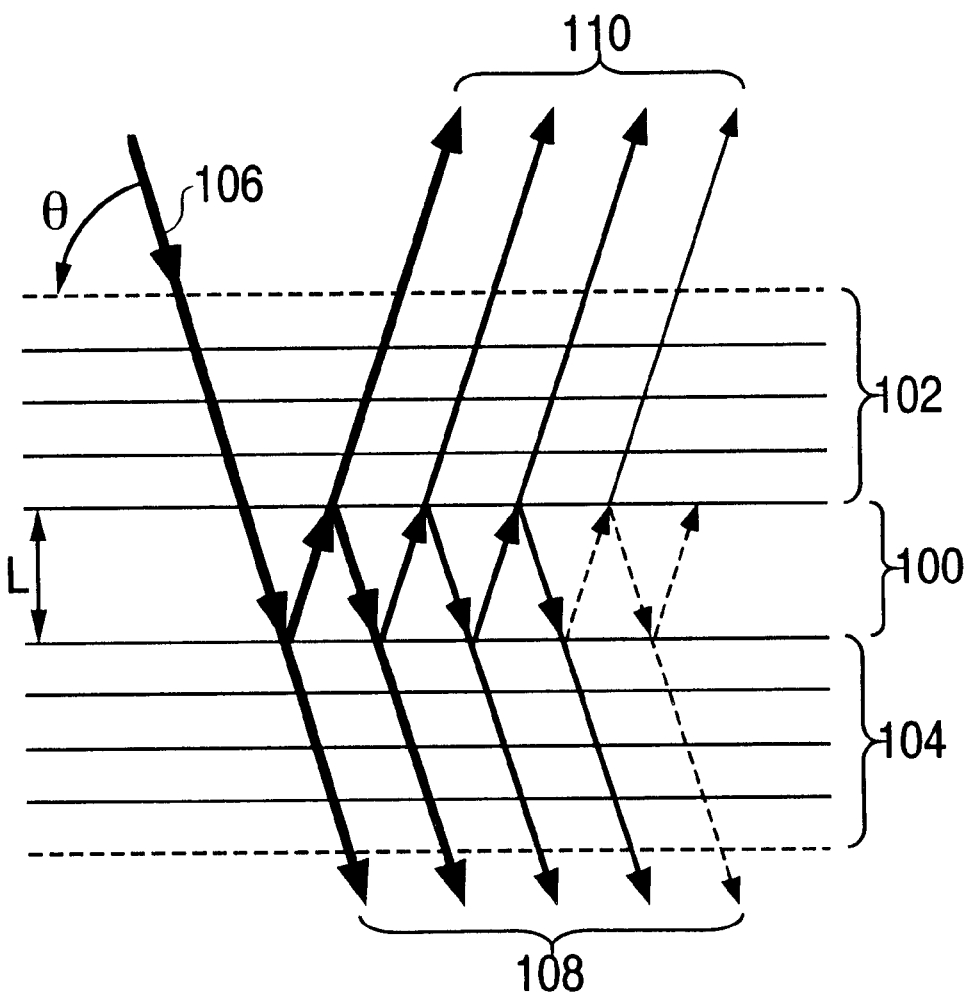
FIG. 4 is a diagram illustrating a Fabry-Perot etalon filter, according to an embodiment of the present invention.

FIG. 4 is a diagram illustrating a Fabry-Perot etalon filter, according to an embodiment of the present invention. Referring now to FIG. 4, a Fabry-Perot etalon filter has a spacer layer 100 sandwiched between high-reflection multilayer films 102 and 104. High-reflection multilayer films 102 and 104 form a resonator in which a resonance condition is determined by an angle of incidence θ of an incident light 106 and a thickness L of spacer layer 100.

When a wavelength of incident light 106 satisfies the resonance condition of the resonator, transparency of incident light 106 is maximized. Therefore, the filter will receive incident light 106 and will pass various wavelength components in passed light 108 (which is a combination of multiple lights) and will reflect various wavelength components in reflected light 110 (which is a combination of multiple lights). In this filter, the angle of incidence θ and the thickness L of spacer layer 100 are predetermined. The transparency characteristics of the filter may periodically have peaks in a predetermined wavelength interval. Therefore, by forming the filter while adjusting the angle of the incidence θ and the thickness L of spacer layer 100, the transparency characteristics of the filter may be periodically varied over a predetermined wavelength interval.

Figure 5A:
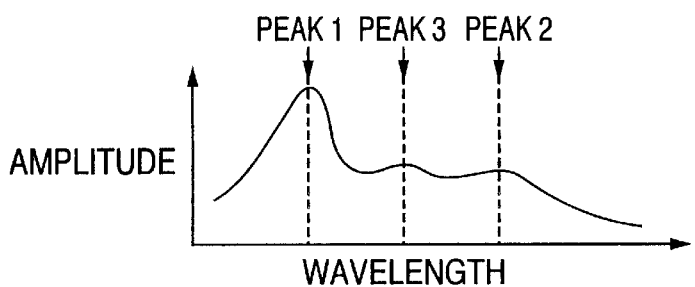
FIG. 5(A) is a graph illustrating amplifier characteristics of an EDFA.

FIG. 5(A) is a graph illustrating amplifier characteristics of Al-high-density EDFA 10. Referring now to FIG. 5(A), the amplifier characteristics includes three peaks, peak 1, peak 2 and peak 3. The amplitude levels of peak 1, peak 2 and peak 3 are generally different, and the wavelength interval between adjacent peaks is substantially equal. Thus, the wavelength interval between peak 1 and peak 3 is substantially equal to the wavelength interval between peak 3 and peak 2. As will be discussed in more detail further below, the amplifier characteristics illustrated in FIG. 5(A) include three peaks (as opposed to, for example, two peaks) since a high density of Al is used in the EDF forming the EDFA.

As illustrated in FIG. 5(A), the amplifier characteristics of Al-high density EDFA 10 has periodical characteristics in a relevant band. Therefore, by use of a Fourier transform, the amplifier characteristics may be substantially transformed to periodical functions. Accordingly, as discussed in more detail below, periodic transparency characteristics of optical filters 20-1, 20-2 and 20-3 can be combined to form reverse characteristics of the amplifier characteristics of Al-high-density EDFA 10.

Figure 5B:
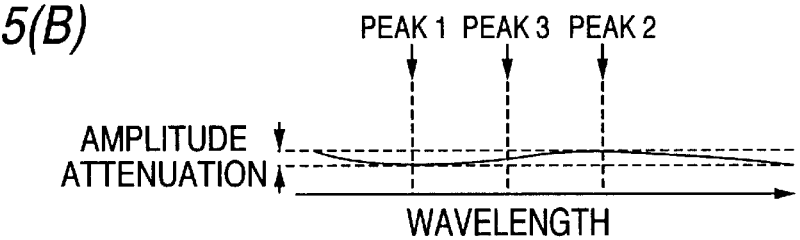
FIG. 5(B) is a graph illustrating transparency characteristics of a first optical filter of a gain equalizer, according to an embodiment of the present invention.

More specifically, FIG. 5(B) is a graph illustrating transparency characteristics of optical filter 20-1, according to an embodiment of the present invention. As illustrated in FIG. 5(B), the transparency characteristics of optical filter 20-1 are represented by a periodic waveform having a period related to a wavelength difference between peaks in the amplifier characteristics of Al-high-density EDFA 10. In the present example, the period of the waveform of the transparency characteristics is determined in accordance with the wavelength difference between peak 1 and peak 2. For example, as illustrated in FIG. 5(B), the transparency characteristics of optical filter 20-1 are represented by a periodic waveform with ¼ period extending between peak 1 and peak 2.

Figure 5C:
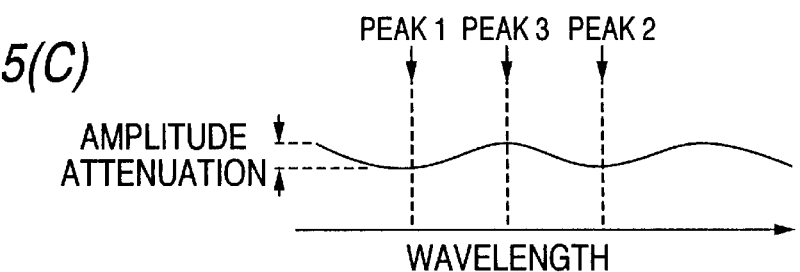
FIG. 5(C) is a graph illustrating transparency characteristics of a second optical filter of a gain equalizer, according to an embodiment of the present invention.

FIG. 5(C) is a graph illustrating transparency characteristics of optical filter 20-2, according to an embodiment of the present invention. As illustrated in FIG. 5(C), the transparency characteristics of optical filter 20-2 are represented by a periodic waveform having a period which is one-half the period of the transparency characteristics of optical filter 20-1. For example, as illustrated in FIG. 5(C), the transparency characteristics of optical filter 20-2 are represented by a periodic waveform with one period extending between peak 1 and peak 2.

Figure 5D:
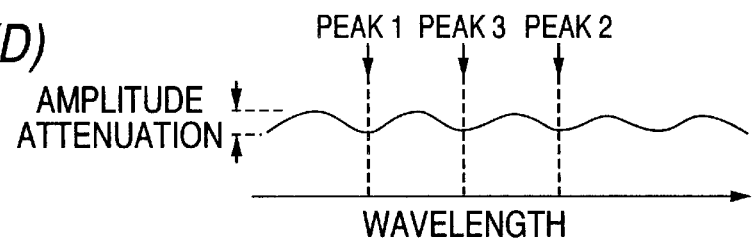
FIG. 5(D) is a graph illustrating transparency characteristics of a third optical filter of a gain equalizer, according to an embodiment of the present invention.

FIG. 5(D) is a graph illustrating transparency characteristics of optical filter 20-3, according to an embodiment of the present invention. As illustrated in FIG. 5(D), the transparency characteristics of optical filter 20-3 are represented by a periodic waveform having a period which is ¼ the period of the waveform of the transparency characteristics of optical filter 20-1. For example, as illustrated in FIG. 5(D), the transparency characteristics of optical filter 20-3 are represented by a periodic waveform with two periods extending between peak 1 and peak 2.

Figure 5E:
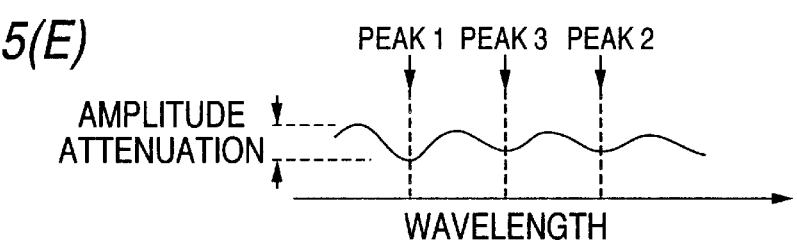
FIG. 5(E) is a graph illustrating a combined waveform of the transparency characteristics of the first, second and third optical filters illustrated in FIGS. 5(B), 5(C) and 5(D), respectively, according to an embodiment of the present invention.

FIG. 5(E) is a graph illustrating a combined waveform of the transparency characteristics of optical filters 20-1, 20-2 and 20-3 illustrated in FIGS. 5(B), 5(C) and 5(D), respectively, according to an embodiment of the present invention. More specifically, as shown in FIG. 5(E), by connecting optical filters 20-1, 20-2 and 20-3 together in series (as illustrated in FIG. 3), a combined waveform is formed having substantial reverse characteristics of the amplifier characteristics of Al-high-density EDFA 10.

Figure 5F:
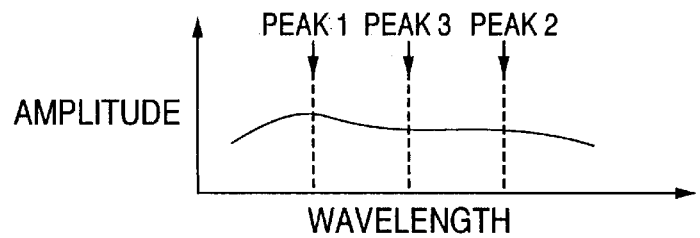
FIG. 5(F) is a graph illustrating a resulting waveform of the amplifier characteristics illustrated in FIG. 5(A) and the combined waveform illustrated in FIG. 5(E), according to an embodiment of the present invention.

FIG. 5(F) is a graph illustrating a resulting waveform of the amplifier characteristics illustrated in FIG. 5(A) of Al-high-density EDFA 10 and the combined waveform illustrated in FIG. 5(E), according to an embodiment of the present invention. In this manner, the amplifier characteristics of Al-high-density EDFA 10 having three gain peaks may be equalized in a wide wavelength band.

In the transparency characteristics illustrated in FIGS. 5(B), 5(C), 5(D) and 5(E), a peak-to-peak amplitude of a periodical waveform corresponds to an attenuation degree of the corresponding filter.

Therefore, according to the above embodiments of the present invention, a gain equalizer equalizes gain versus wavelength characteristics of an optical amplifier. The gain versus wavelength characteristics of the optical amplifier include first, second and third gain peaks in a wavelength band with the second gain peak being between the first and third gain peaks and a wavelength difference between the first and third gain peaks. The optical amplifier amplifies an input signal in accordance with the gain versus wavelength characteristics to produce an output signal. The gain equalizer includes first, second and third optical filters having first, second and third transparency characteristics, respectively. The first, second and third transparency characteristics are periodic waveforms having different periods related to the wavelength difference between the first and third gain peaks. For example, the second transparency characteristic is a waveform having a period equal to 1/($2^n$) of the period of the waveform of the first transparency characteristic. The third transparency characteristic is a waveform having a period equal to ¼ of the period of the waveform of the first transparency characteristic.

More specifically, for example, as illustrated in FIGS. 5(A), 5(B), 5(C) and 5(D), the first transparency characteristic is a periodic waveform with ¼ period extending between peak 1 and peak 2. The second transparency characteristic is a periodic waveform with one period extending between the peak 1 and peak 2. The third transparency characteristic is a periodic waveform with two periods extending between peak 1 and peak 2.

FIGS. 6(A), 6(B) and 6(C) are graphs illustrating amplifier characteristics of an EDFA in relation to the aluminum (Al) densities in the EDF. More specifically, FIG. 6(A) is a graph illustrating amplifier characteristics of an EDFA for small aluminum (Al) densities of less than 1 Wt %. FIG. 6(C) is a graph illustrating amplifier characteristics of an EDFA for high aluminum (Al) densities of greater than approximately 4 Wt %. FIG. 6(B) is a graph illustrating amplifier characteristics of an EDFA for medium aluminum (Al) densities between the 1 Wt % and 4 Wt %.

From FIGS. 6(A), 6(B) and 6(C), it can be seen that, as the Al density increases from a low-density condition of less than 1 Wt %, a peak 2 forms in the 1555-$\mu$m gain band and extends toward a short wavelength side. When the Al density increases to a high-density condition of more than approximately 4 Wt %, the 1.545-$\mu$m gain band rises, and a peak 3 forms.

Figure 8:
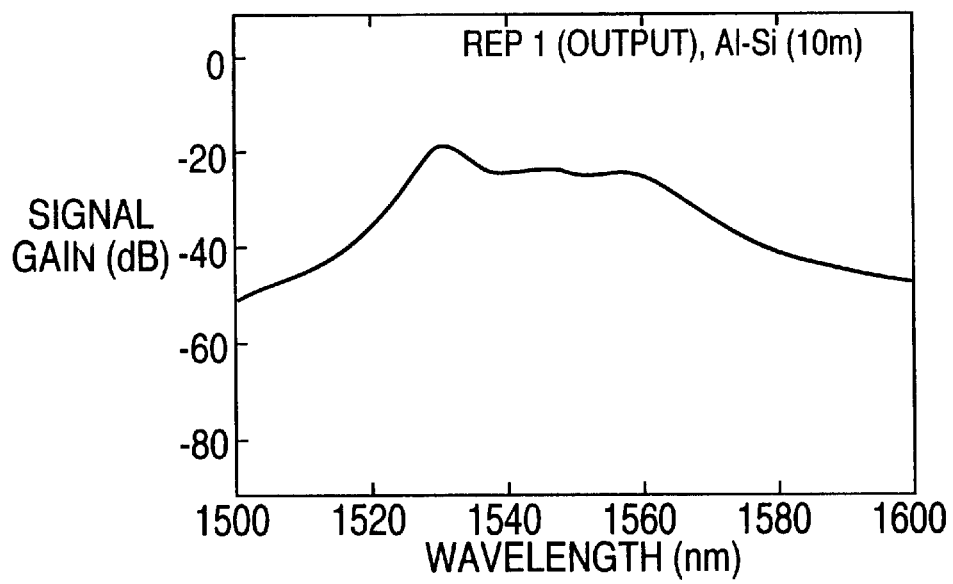
FIG. 8 is a graph illustrating amplifier characteristics of an Al-high-density (more than 1 Wt %) EDFA, according to an embodiment of the present invention.

FIG. 7 is a graph illustrating amplifier characteristics of an Al-low-density (less than 1 Wt %) EDFA, and FIG. 8 is a graph illustrating amplifier characteristics of an Al-high-density (more than 1 Wt %) EDFA.

In the gain versus wavelength characteristics of the Al-high-density EDFA shown in FIG. 8, a minimum value of the gain in the 1.54-$\mu$m band is smaller and the gain versus wavelength characteristics are relatively flat, as compared to the gain versus wavelength characteristics of the Al-low-density EDFA shown in FIG. 7. However, the gain versus wavelength characteristics of the Al-high-density EDFA has a third gain peak between the 1.54-$\mu$m band and the 1.555-$\mu$m band.

Therefore, although the Al-high-density EDFA may provide wide band transmission characteristics, when a number of optical amplifier are connected in series, ripple may occur in the signal transmission band.

Figure 9:
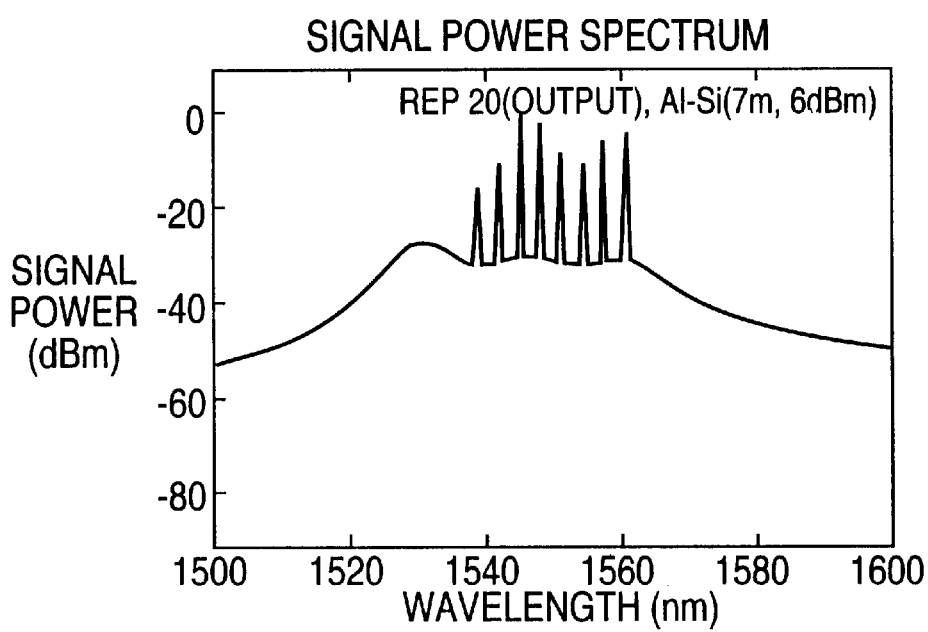
FIG. 9 is a graph illustrating calculated transmission characteristics of a WDM signal in a case where twenty (20) Al-high-density EDFAs are connected in series.

FIG. 9 is a graph illustrating calculated transmission characteristics of a WDM signal in a case where twenty (20) Al-high-density EDFAs are connected in series. Gain dispersion shown in FIG. 9 may be reduced by a gain equalizer according to embodiments of the present invention.

The following is a detailed description of a gain equalizing operation for the gain versus wavelength characteristics of the Al-low-density EDFA shown in FIG. 7 and the gain versus wavelength characteristics of the Al-high-density EDFA shown in FIG. 8.

As shown in FIG. 7, the gain versus wavelength characteristics of the Al-low-density EDFA has two peaks. In this case, a gain equalizer according to embodiments of the present invention may be constructed with a first Fabry-Perot etalon filter (such as, for example, optical filter 20-1) having transparency characteristics represented by a periodic waveform having a period related to the wavelength difference between the two peaks, and a second Fabry-Perot etalon filter (for example, optical filter 20-2) having transparency characteristics represented by a periodic waveform having a period equal to one-half the period of the waveform of the first Fabry-Perot etalon filter.

Figure 10:
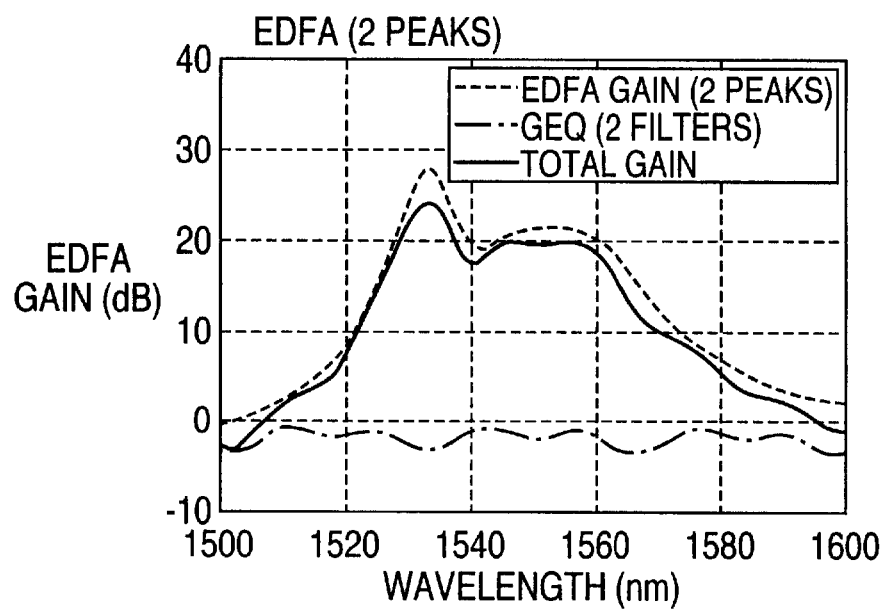
FIG. 10 is a graph illustrating transparency characteristics of a gain equalizer (GEQ) and an equalized total gain in a case where Fabry-Perot etalon filters of 32-nm and 16-nm periods of wavelength are connected in series, according to an embodiment of the present invention.

FIG. 10 is a graph illustrating transparency characteristics of a gain equalizer (GEQ) and an equalized total gain in a case where Fabry-Perot etalon filters of 32-nm and 16-nm periods are connected in series (for example, see optical filters 20-1 and 20-2 in FIG. 3), according to an embodiment of the present invention. To easily understand the operation of a gain equalizer, the gain versus wavelength characteristics (EDFA gain) of the Al-low-density EDFA shown in FIG. 7 are also represented in FIG. 10.

In FIG. 10, the transparency characteristics in a 1533-nm to 1560-nm band may be substantially equal to the reverse characteristics of the gain versus wavelength characteristics of an Al-low-density EDFA, with optical filters used as a gain equalizer. In this case, an approximate equation with respect to transparency $T(\lambda)$ of a Fabry-Perot etalon filter is represented as follows:

$$T(\lambda) = 10\log_{10}\left\{\frac{(1-R_1)^2}{(1-R_1)^2 + 4\times R_1 \times \cos^2\left\{\frac{2\pi(\lambda-\lambda_0)}{F_1\times 2}+\phi_1\times\pi\right\}}\right\}+$$

$$10\log_{10}\left\{\frac{(1-R_2)^2}{(1-R_2)^2 + 4\times R_2 \times \sin^2\left\{\frac{2\pi(\lambda-\lambda_0)}{F_2\times 2}+\phi_2\times\pi\right\}}\right\}$$

$\lambda_0 = 1533$,
$R_1 = 0.1 \quad F_1 = 32, \quad \phi_1 = 0.0$
$R_2 = 0.1 \quad F_2 = 16, \quad \phi_2 = 0.4$ In this manner, the amplifier characteristics (EDFA gain) of an Al-low-density EDFA may be equalized by the transparency characteristics of the gain equalizer. From the equalizing result (total gain), by combining two different periodical optical filters (a first optical filter having transparency characteristics represented by a periodical waveform having a period related to the wavelength difference between peaks of the amplifier characteristics, and a second optical filter having transparency characteristics represented by a periodic waveform with a period substantially equal to one-half of the period of the waveform of the first optical filter), the gain versus wavelength characteristics of the Al-low-density EDFA may be flattened in an approximately 15-nm wide wavelength band.

On the other hand, as shown in FIG. 8, the gain versus wavelength characteristics of an Al-high-density EDFA has three peaks. In this case, a gain equalizer according to the embodiments of the present invention may be formed by three Fabry-Perot etalon filters (such as optical filters 20-1, 20-2 and 20-3 illustrated in FIG. 3) where the transmission characteristics of a first optical filter has transparency characteristics related to the wavelength difference between peaks of the amplifier characteristics, a second optical filter has transparency characteristics represented by a periodic waveform having a period substantially equal to one-half of the period of the waveform of the first optical filter, and a third optical filter has transparency characteristics represented by a periodic waveform with a period substantially equal to one-quarter the period of the waveform of the first optical filter.

Figure 11:
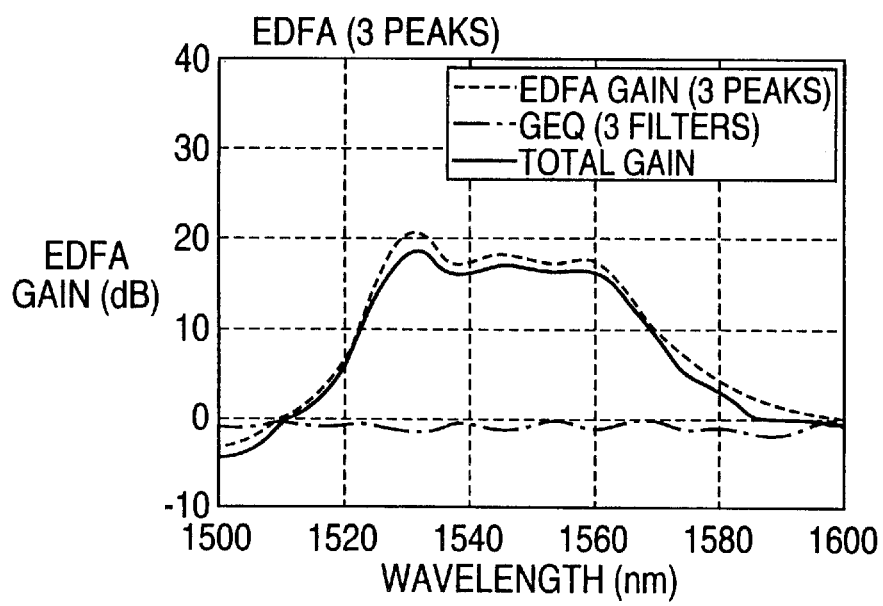
FIG. 11 is a graph illustrating transparency characteristics of a gain equalizer (GEQ) and an equalizing result in a case where Fabry-Perot etalon filters of 56-nm, 28-nm and 14-nm periods of wavelength are connected in series, according to an embodiment of the present invention.

FIG. 11 is a graph illustrating transparency characteristics of a gain equalizer (GEQ) and an equalizing result in a case where Fabry-Perot etalon filters of 56-nm, 28-nm and 14-nm periods are connected in series, according to an embodiment of the present invention. To easily understand the operation of the gain equalizer, the gain versus wavelength characteristics (EDFA gain) of the Al-high-density EDFA shown in FIG. 8 is also represented in FIG. 11.

In FIG. 11, the transparency characteristics in a 1533-nm to 1560-nm band may be substantially equal to the reverse characteristics of the gain versus wavelength characteristics of an Al-high-density EDFA, with optical filters being used as a gain equalizer. In this case, an approximate equation with respect to transparency $T(\lambda)$ of a Fabry-Perot etalon filter is represented as follows:

$$T(\lambda) = 10\log_{10}\left\{\frac{(1-R_1)^2}{(1-R_1)^2 + 4\times R_1 \times \cos^2\left\{\frac{2\pi(\lambda-\lambda_0)}{F_1\times 2}+\phi_1\times\pi\right\}}\right\}+$$

$$10\log_{10}\left\{\frac{(1-R_2)^2}{(1-R_2)^2 + 4\times R_2 \times \sin^2\left\{\frac{2\pi(\lambda-\lambda_0)}{F_2\times 2}+\phi_2\times\pi\right\}}\right\}+$$

$$10\log_{10}\left\{\frac{(1-R_3)^2}{(1-R_3)^2 + 4\times R_3 \times \cos^2\left\{\frac{2\pi(\lambda-\lambda_0)}{F_3\times 2}+\phi_2\times\pi\right\}}\right\}$$

$\lambda_0 = 1532$
$R_1 = 0.040 \quad F_1 = 56 \quad \phi_1 = 0.0$
$R_2 = 0.025 \quad F_2 = 28 \quad \phi_2 = 0.6$
$R_3 = 0.045 \quad F_3 = 14 \quad \phi_3 = 0.0$ In this manner, the amplifier characteristics (EDFA gain) of an Al-high-density EDFA may be equalized by the transparency characteristics of a gain equalizer. From the equalizing result (total gain), by combining three different periodical optical filters, the gain versus wavelength characteristics of an Al-high-density EDFA may be flattened in an approximately 30-nm wide wavelength band. For example, a first optical filter can have transparency characteristics represented by a periodic waveform having a period related to the wavelength difference between peaks of the amplifier characteristics, a second optical filter can have transparency characteristics represented by a periodic waveform with a period substantially equal to one-half of the period of the waveform of the first optical filter, and a third optical filter can have transparency characteristics represented by a periodic waveform with a period substantially equal to one-quarter the period of the waveform of the first optical filter.

In the various proposed method for equalizing gain as discussed in the Background of the Invention section, a single band adjacent to one gain peak is used, and a resulting flattened band is approximately 10 nm. By contrast, a gain equalizer according to embodiments of the present invention can provide a much wider gain band by using more than one peak to flatten gain.

Figure 12:
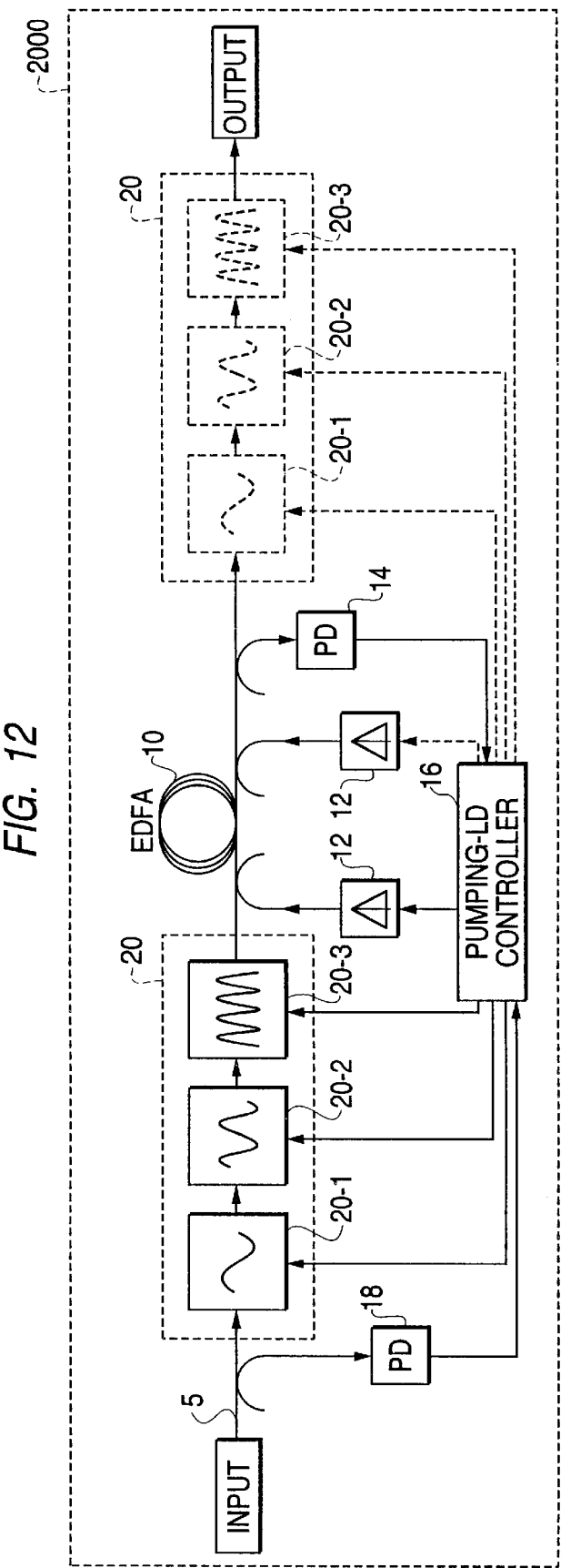
FIG. 12 is a diagram illustrating a gain equalizer for equalizing amplifier characteristics of an Al-high-density EDFA, according to an embodiment of the present invention.

FIG. 12 is a diagram illustrating a gain equalizer for equalizing amplifier characteristics of an Al-high-density EDFA, according to an embodiment of the present invention, and which is similar to the gain equalizer illustrated in FIG. 3. In FIG. 12, an amplification and equalization device 2000 includes optical filters 20-1, 20-2 and 20-3. Optical filters 20-1, 20-2 and 20-3 are illustrated with solid lines to indicate a case where the optical filters are provided at the input side of Al-high-density EDFA 10, and optical filters 20-1, 20-2 and 20-3 are illustrated with dotted lines to indicate a case where the optical filters are provided at an output side of Al-high-density EDFA 11. As illustrated in FIG. 12, optical filters 20-1, 20-2 and 20-3 are connected in series.

A portion of the WDM signal can be decoupled and detected by a photo detector 18, which provides an output signal to pumping LD controller 16. LD controller 16 can then determine characteristics of the WDM signal from the decoupled portion and control optical filters 20-1, 20-2, 20-3 to adjust parameters such as period, phase, and amplitude (attenuation) of the waveform of the transparency characteristics. Theses adjustment can be performed in a Fabry-Perot etalon filter by adjusting the incident angle of the light, and mechanically adjusting the thickness L of a spacer layer in the filter.

Further, when the spacer layer has previously been formed so that the thickness varies in a horizontal direction, substantially the same adjustment may be performed by changing (sliding) an incident position of the light. In a case when the gain versus wavelength characteristics of the EDFA varies due to age softening, and in a case when the EDFA has malfunction, these parameters can then easily be adjusted.

Therefore, according to the above embodiments of the present invention, a controller (such as pumping-LD controller 16) controls optical filters of a gain equalizer to adjust the period, phase and/or attenuation degree of the waveforms of the transparency characteristics of the optical filters.

Moreover, by arranging a plurality of optical filters in series having transparency characteristics with different periods, phase, and amplitude (attenuation), as illustrated in FIG. 12, the amplifier characteristics of an EDFA having a plurality of gain peaks can be equalized in a wider wavelength band.

Figure 13:
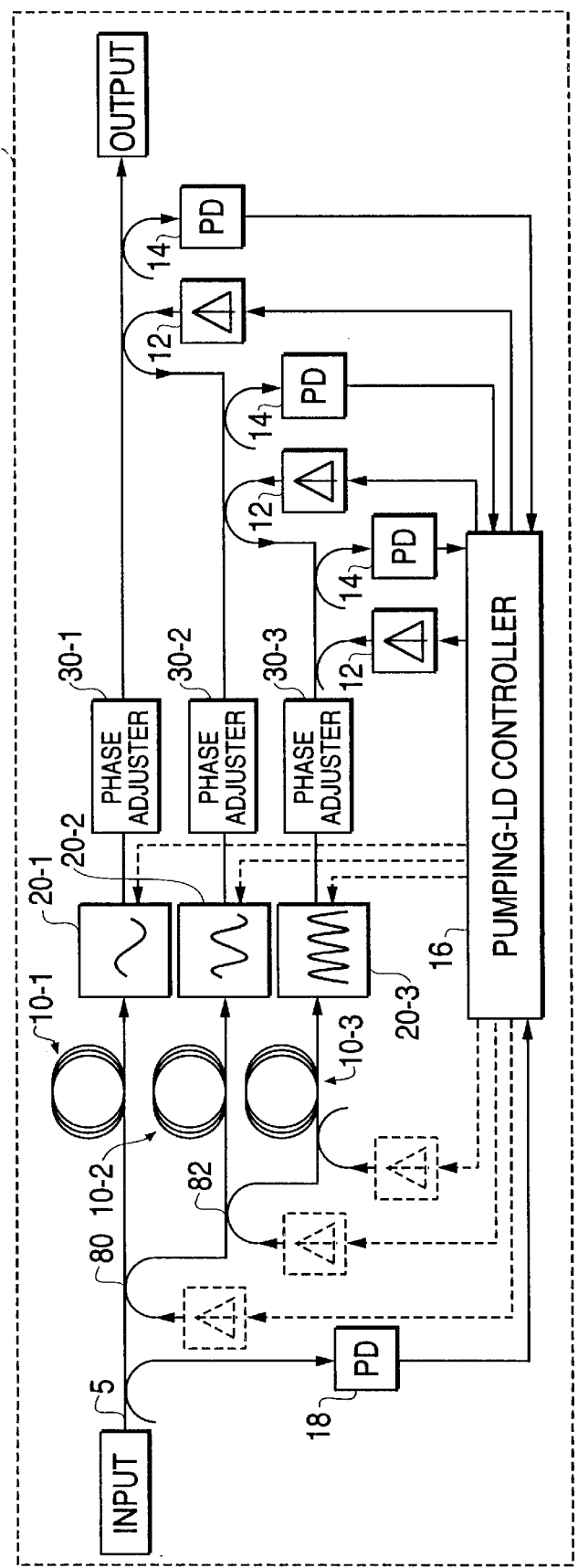
FIG. 13 is a diagram illustrating a gain equalizer for equalizing amplifier characteristics of an Al-high-density EDFA, according to an additional embodiment of the present invention.

FIG. 13 is a diagram illustrating a gain equalizer for equalizing amplifier characteristics of an Al-high-density EDFA, according to an additional embodiment of the present invention. Referring now to FIG. 13, an amplification and equalization device 3000 includes optical filters 20-1, 20-2 and 20-3 connected in parallel.

A WDM signal is divided by branching devices 80 and 82 into three separate signals. A first signal passes through a first Al-high-density EDFA 10-1. A second signal passes through a second Al-high-density EDFA 10-2. Similarly, third signal passes through a third Al-high-density EDFA 10-3. Thus, branching devices 80 and 82, taken together, can be considered to be a branching device which branches the WDM signal into first, second and third signals which are each passed through a different EDFA. Al-high-density EDFAs 10-1, 10-2 and 10-3 preferably have substantially the same gain versus wavelength characteristics.

The first signal, amplified by Al-high-density EDFA 10-1, is filtered by optical filter 20-1 having transparency characteristics represented by a periodic waveform with a period related to a wavelength difference between peaks of the amplifier characteristics, as previously described. The second signal, amplified by Al-high-density EDFA 10-2, is filtered by optical filter 20-2 having transparency characteristics represented by a periodic waveform with a period equal to one-half the period of the waveform of the transparency characteristics of optical filter 20-1, as previously described. The third signal, amplified by Al-high-density EDFA 10-3, is filtered by optical filter 20-3 having transparency characteristics represented by a periodic waveform with a period equal to one-quarter the period of the waveform of the transparency characteristics of optical filter 20-1, as previously described.

The filtered, amplified signals produced by optical filters 20-1, 20-2 and 20-3 are then combined into a resulting signal which is output as an amplified WDM signal. To properly combine the filtered amplified signals, the phases of filtered amplified signals to be combined are adjusted by phase adjusters 30-1, 30-2 and 30-3. A conventional optical coupler can easily perform such a combining operation.

In FIG. 13, optical filters 20-1, 20-2 and 20-3 are positioned in parallel and after the corresponding Al-high-density EDFA 10-1, 10-2 and 10-3, respectively. However, optical filters 20-1, 20-2 and 20-3 can be positioned in parallel and before the corresponding Al-high-density EDFA 10-1, 10-2 and 10-3, respectively.

In FIG. 13, branching devices 80 and 82 branch the WDM signal into first, second and third signals before the WDM signal is amplified. The first, second and third signals are then individually amplified and filtered. However, the embodiments of the present invention are not intended to be limited to branching the WDM signal before the WDM signal is amplified.

Figure 14:
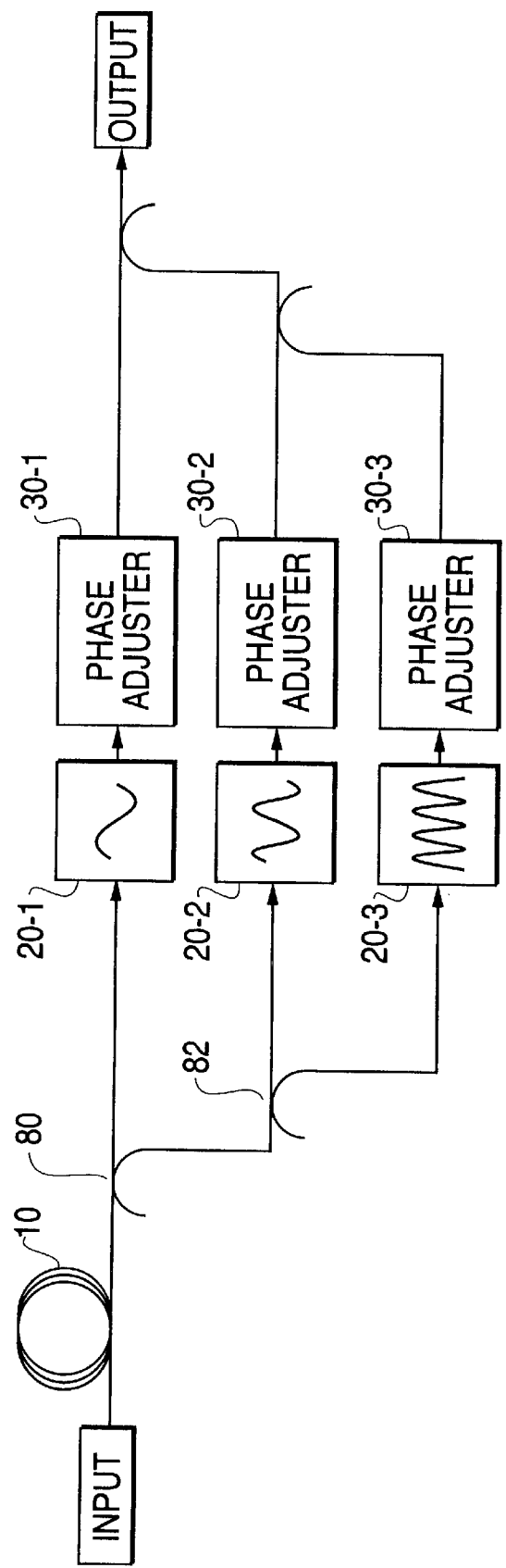
FIG. 14 is a diagram illustrating a modification of the gain equalizer illustrated in FIG. 13, according to an embodiment of the present invention.

For example, FIG. 14 is a diagram illustrating a modification of the gain equalizer illustrated in FIG. 13, according to an embodiment of the present invention. As illustrated in FIG. 14, a single EDFA 10 is used to amplify a WDM signal. Branching devices 80 and 82 are positioned after EDFA 10. Therefore, branching devices 80 and 82 branch the amplified WDM signal into first, second and third signals which are provided to optical filters 20-1, 20-2 and 20-3, respectively. The filtered signals are then combined together into an amplified, filtered WDM signal.

Figure 15:
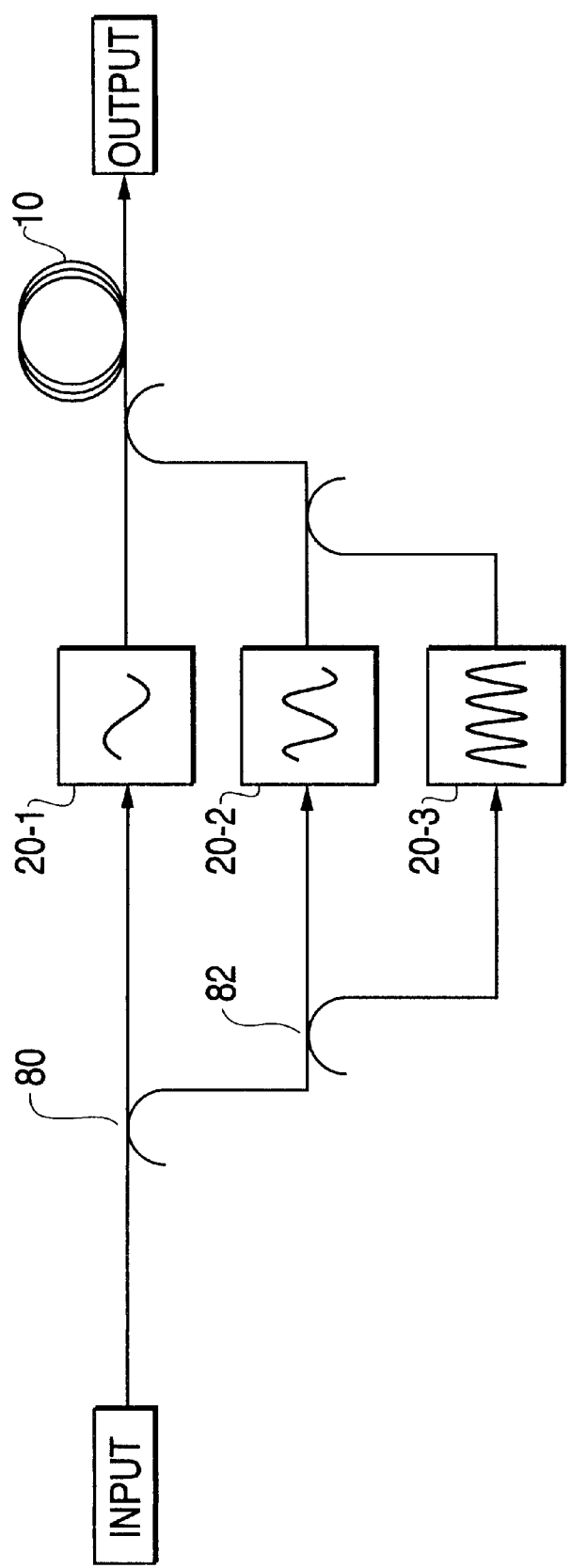
FIG. 15 is a diagram illustrating a modification of the gain equalizer illustrated in FIG. 13, according to an embodiment of the present invention.

FIG. 15 is a diagram illustrating a further modification of the gain equalizer illustrated in FIG. 13, according to an embodiment of the present invention. As illustrated in FIG. 15, a single EDFA 10 is used to amplify a WDM signal. Branching devices 80 and 82 and filters 20-1, 20-2 and 20-3 are positioned before EDFA 10. Therefore, branching devices 80 and 82 branch the WDM signal into first, second and third signals which are provided to optical filters 20-1, 20-2 and 20-3, respectively. The filtered signals are then combined together into a filtered WDM signal which is then amplified by EDFA 10.

FIGS. 14 and 15 are simplified drawings and do not show a pumping-LD controller, associated laser diodes and associated photo detectors. However, such components, as illustrated in FIG. 13, can be included in the configurations illustrated in FIGS. 14 and 15. Moreover, phase adjusters 30-1, 30-2 and 30-3 are not illustrated in FIG. 15 but, if desired, can be provided after optical filters 20-1, 20-2 and 20-3, respectively.

By connecting a plurality of optical filters in parallel having different periods, phase, and amplitude (attenuation) of transparency characteristics, as illustrated in FIG. 13, 14 and 15, the transparency characteristics of a plurality of optical filters can be combined. Therefore, such a configuration will allow the amplifier characteristics of an EDFA having a plurality of gain peaks to be equalized in a wider wavelength band.

Moreover, by connecting a plurality of periodical optical filters in parallel and then combining the output of the optical filters, as illustrated in FIGS. 13, 14 and 15, dispersion of the gain versus wavelength characteristics of an optical amplifier having a plurality of gain peaks can be equalized in a relatively wide wavelength band.

As an index indicating an excited state of an EDFA, an inversion parameter, which is a ratio of an erbium-ion density in an excited state to a total erbium-ion density, is commonly used. Further, in an EDFA, even if in input signal is provided to the EDFA, a light is spontaneously emitted from the EDFA. This spontaneously emitted light is typically referred to as "amplified spontaneous emission" (ASE).

In the following description, a case when the inversion parameter is less than 0.6 is referred to as a "saturation state", and a case when the inversion parameter is more than 0.6 is referred to as an "unsaturated state". Now, considering the amplifier characteristics of an EDFA, in an Al-low-density EDFA, ASE-3dB wavelength bands indicating a quantity index of the signal transmission band are substantially the same, i.e., approximately 10-nm in both the saturation state and unsaturated state. On the other hand, in an Al-high-density EDFA, the ASE-3dB wavelength band in the unsaturated state is wider than that in the saturation state.

Therefore, when a tens-of-nm wavelength wide amplifying band having little gain dispersion is required, use of an Al-high-density EDFA operating in the unsaturated state is more effective. However, when Al-high-density EDFAs operating in the unsaturated state are connected in a multiple-stage form, a 1.53 $\mu$m band ASE increases, and a large gain tilt occurs. Therefore, when using an Al-high-density EDFA operating in the unsaturated state, the 1.53 $\mu$m band ASE needs to be removed.

In the unsaturated state, an EDFA generally has characteristics which amplify optical power particularly in the 1.53 $\mu$m band. Therefore, if the optical power in this band is initially small, degradation of the overall optical SNR may be reduced.

Figure 16:
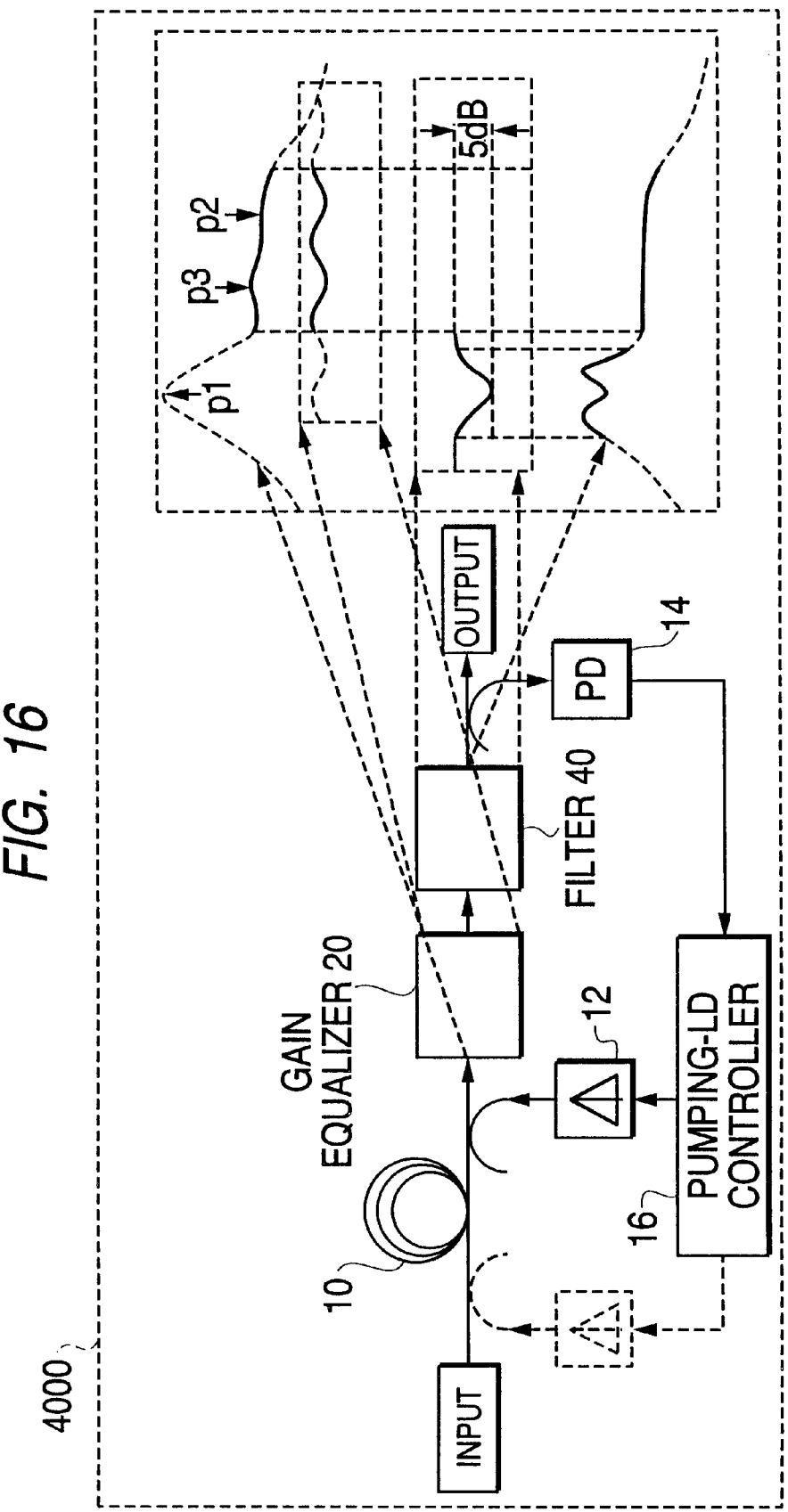
FIG. 16 is a diagram illustrating a gain equalizer for equalizing amplifier characteristics of an Al-high-density EDFA, according to a further embodiment of the present invention.

FIG. 16 is a diagram illustrating a gain equalizer for equalizing amplifier characteristics of an Al-high-density EDFA, according to a further embodiment of the present invention. Referring now to FIG. 16, an amplification and equalization device 4000 includes gain equalizer 20 and a 1.53 $\mu$m band attenuation (notch) filter 40. Attenuation filter 40 operates as an optical attenuator and is provided between gain equalizer 20 and an output terminal. Attenuation filter 40 allows degradation of the optical SNR in the next stage optical amplifier to be significantly reduced.

Therefore, at least one of a plurality of gain peaks of an optical amplifier can be attenuated by using an attenuation filter. Such use of an attenuation filter is effective for use in an optical communication system in which spontaneously generate noise level (ASE) light in a specified wavelength band increases. Therefore, the use of an attenuation filter will reduce degradation of optical signal to noise ratio (SNR).

Figure 17:
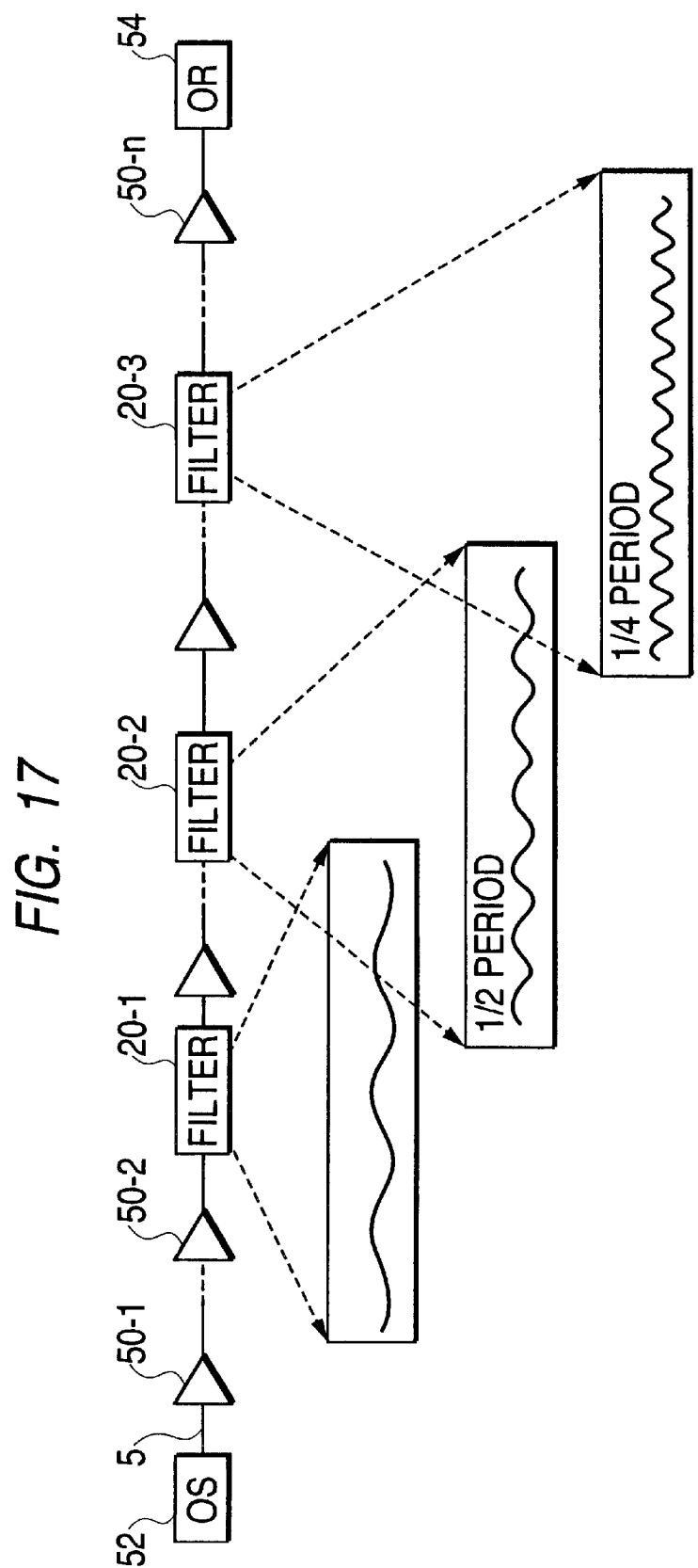
FIG. 17 is a diagram illustrating an optical transmission system which includes a gain equalizer, according to an embodiment of the present invention.

FIG. 17 is a diagram illustrating an optical transmission system which includes a gain equalizer, according to an embodiment of the present invention. Referring now to FIG. 17, an optical sending station (OS) 52 sends an optical signal, such as a WDM signal, through transmission line 5 to an optical receiving station (OR) 54. Optical amplifiers 50-1 to 50-n (for a total of "n" optical amplifiers) are connected in series along transmission line 5. Optical filters 20-1, 20-2, 20-3, having transmission characteristics with different periods (as previously described), are arranged at proper intervals from each other along transmission line 5. Such an optical transmission system can simultaneously equalize a WDM signal passed through a plurality of optical amplifiers.

Therefore, as illustrated in FIG. 17, a plurality of optical filters are arranged along a transmission line in series in a multi-stage form, to allow a single gain equalizer (comprising the plurality of optical filters) to equalize gain dispersion of a plurality of optical amplifiers.

Figure 18:
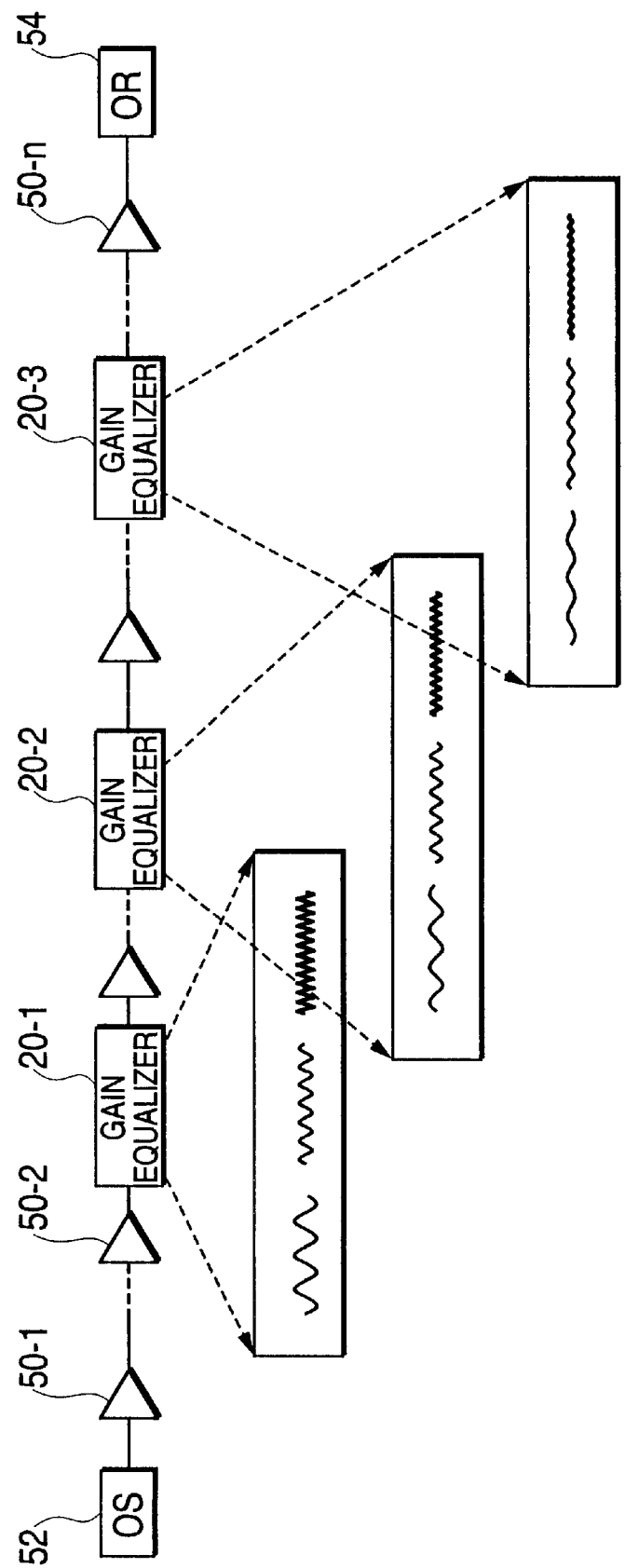
FIG. 18 is a diagram illustrating an optical transmission system which includes a plurality of gain equalizers, according to an embodiment of the present invention.

FIG. 18 is a diagram illustrating an optical transmission system which includes a plurality of gain equalizers, according to an additional embodiment of the present invention. Referring now to FIG. 18, n optical amplifiers 50-1 to 50-n are connected in series along transmission line 5. Gain equalizers 20#1 to 20#3 are arranged at appropriate intervals along transmission line 5. Each gain equalizer 20#1, 20#2 and 20#3 includes optical filters for equalizing the gain of optical amplifiers 50-1 to 50-n. For example, each gain equalizer 20#1, 20#2 and 20#3 includes optical filters 20-1, 20-2, 20-3 (see FIG. 3) having transparency characteristics with different periods. In FIG. 18, gain equalizers 20#1, 20#2 and 20#3 are connected in series.

Moreover, for example, each gain equalizer 20#1, 20#2 and 20#3 can compensates for, as a whole, the characteristics of all optical amplifiers located at the preceding stages of, and the following stages of, the respective gain equalizer.

The optical transmission system illustrated in FIG. 18 is effective when the optical SNR of each channel of a WDM signal is to be equalized as the WDM signal travels along a path of the optical transmission system. For example, the optical transmission system illustrated in FIG. 18 is effective when portions of the WDM signal light are branched from the transmission path, or when various signals are combined together into a WDM signal light which travels along the transmission path.

Figure 19:
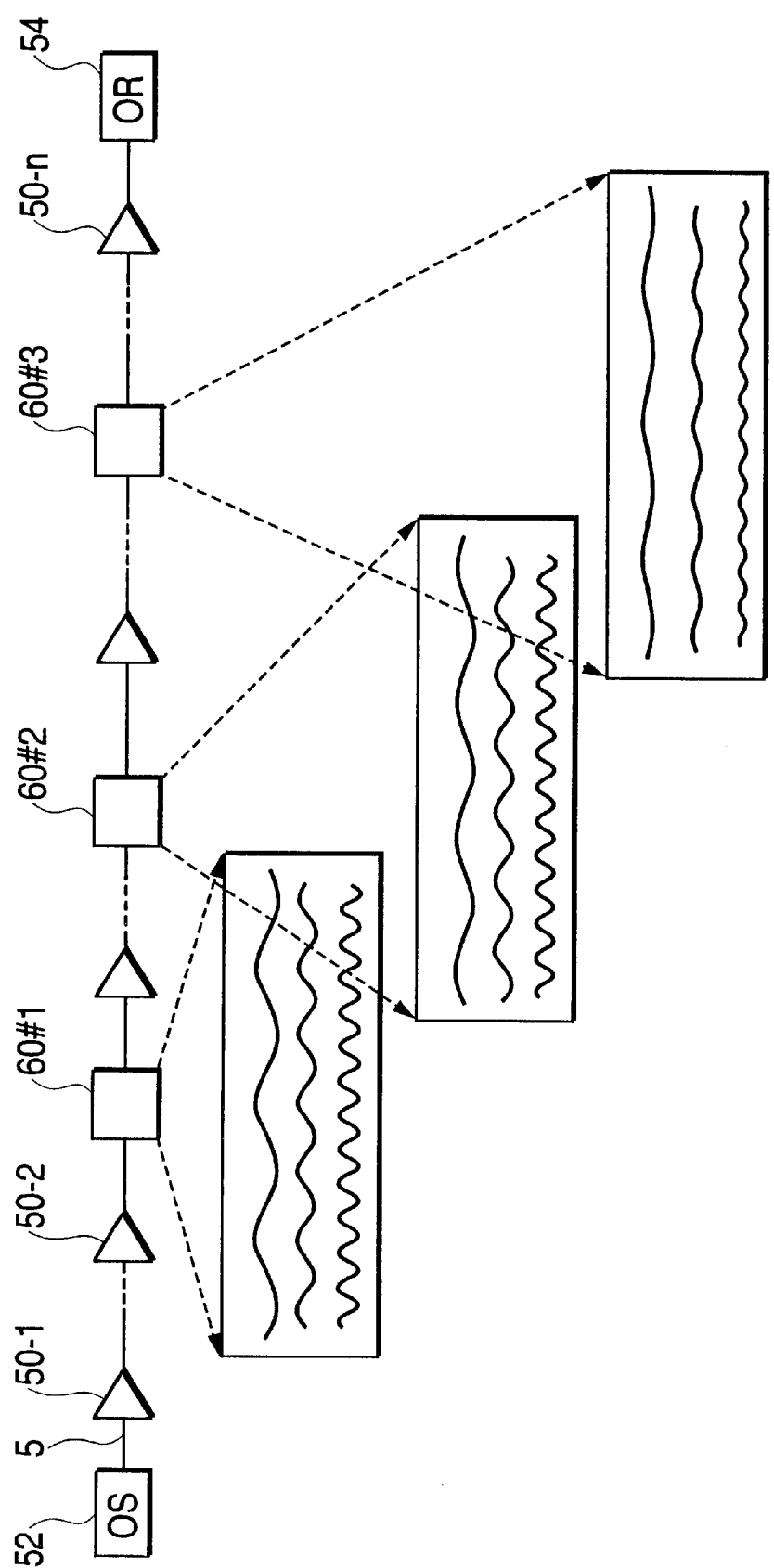
FIG. 19 is a diagram illustrating an optical transmission system which includes a plurality of gain equalizers, according to an additional embodiment of the present invention.

FIG. 19 is a diagram illustrating an optical transmission system which includes a plurality of amplification and equalization devices, according to an embodiment of the present invention. Referring now to FIG. 19, n optical amplifiers 50-1 to 50-n are connected in series along transmission line 5. Amplification and equalization devices 60#1 to 60#3 are arranged at appropriate intervals along transmission line 5. Each amplification and equalization device 60#1 to 60#3 includes, for example, optical filters 20-1, 20-2, 20-3 connected in parallel as shown in FIG. 13. Thus, each amplification and equalization device 60#1 to 60#3 is configured as, for example, amplification and equalization device 3000 illustrated in FIG. 13. Such an optical transmission system can simultaneously equalize a WDM signal passed through a plurality of optical amplifiers.

Moreover, for example, each amplification and equalization device 60#1 to 60#3 can compensates for, as a whole, the characteristics of all optical amplifiers located at the preceding stages of, and the following stages of, the respective amplification and equalization device.

Therefore, according to the above embodiments of the present invention, a communication system connects an optical sending station to an optical receiving station so that an optical signal sent by the optical sending station is received by the optical receiving station. The communication system includes a plurality of optical amplifiers which each amplify the optical signal sent by the optical sending station before being received by the optical receiving station. The plurality of optical amplifiers have a combined gain versus wavelength characteristic with first and second gain peaks in a wavelength band and a wavelength difference between the first and second gain peaks. The communication system also includes a plurality of filters which filter the optical signal sent by the optical sending station before being received by the optical receiving station. Each filter has a transparency characteristic which is a periodic waveform having a period related to the wavelength difference between the first and second gain peaks. The filters can be included in various equalizers, where each equalizer has filters connected either in series or in parallel.

The wavelength, phase, and amplitude (attenuation) of the transparency characteristics of each gain equalizer shown in FIGS. 17, 18, and 19 are adjustable to allow an overall optical SNR in the transmission system to be equalized. Preferably, such adjustment can be made in accordance with a command signal produced from a remote location (not illustrated). Such adjustment can be performed if a Fabry-Perot etalon filter, shown in FIG. 4, is used as an optical filter. More specifically, a Fabry-Perot etalon filter will allow the period, phase, and amplitude (attenuation) of the transparency characteristics of each gain equalizer to be controlled by adjusting the incident angle of light and mechanically adjusting the thickness L of a spacer layer (see spacer layer 100 in FIG. 4). In addition, when the spacer layer has been previously formed so that the thickness varies in a horizontal direction, substantially the same adjustment can be performed by changing (sliding) an incident position of the light.

Therefore, based on the command produced from a remote location, the period, phase, and attenuation degree of the transparency characteristics of an optical filter can be adjusted. As a result, when the transparency characteristics of the optical amplifier varies due to age softening, or when the optical amplifier malfunctions, the transparency characteristics of the gain equalizer can be properly adjusted.

According to the above embodiments of the present invention, Al-high-density EDFAs are used as optical amplifiers. However, the present invention is not intended to be limited to use with any specific density EDFA. Many different densities can be used in various embodiments of the present invention. Moreover, the various embodiments of the present invention are not intended to be limited to use with an EDFA, and many other types of optical amplifiers can be used. For example, optical amplifiers can be formed by doping a fiber with rare earth elements other than Erbium.

According to embodiments of the present invention as described above, amplifier characteristics having periodical peaks may be equalized in a wide wavelength band by properly combining a plurality of optical filters having different transparency characteristics (that is, different periods, phase, or amplitude (attenuation)).

According to the above embodiments of the present invention, a gain equalizer includes optical filters having transparency characteristics represented by periodic waveforms with different periods. Various examples of the periods are also provided herein. For example, as illustrated in FIGS. 5(B), 5(C) and 5(D), a second optical filter has transparency characteristics represented by a waveform with a period which is ½ the period of a waveform representing transparency characteristic of a first optical filter. Similarly, a third optical filter has a transparency characteristics represented by a waveform with a period which is ¼ the period of a waveform representing transparency characteristic of the first optical filter. However, the present invention is not intended to be limited to these specific periods. Instead, other relative periods can be used.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus for equalizing gain versus wavelength characteristics of an optical amplifier, the gain versus wavelength characteristics having first and second gain peaks in a wavelength band with a wavelength difference between the first and second gain peaks, the apparatus comprising:

first and second optical filters connected to the optical amplifier and having first and second transparency characteristics, respectively, the first and second transparency characteristics being periodic waveforms having periods related to the wavelength difference between the first and second gain peaks, the period of the waveform of the first transparency characteristic being different from the period of the waveform of the second transparency characteristic.

2. An apparatus as in claim 1, wherein the gain versus wavelength characteristics of the optical amplifier include a third gain peak between the first and second gain peaks, and the apparatus further comprises:

a third optical filter connected to the optical amplifier and having a third transparency characteristic which is a periodic waveform having a period related to the wavelength difference between the first and second gain peaks, the period of the waveform of the third transparency characteristic being different from the periods of the waveforms of the first and second transparency characteristics.

3. An apparatus as in claim 1, wherein the first transparency characteristic is a periodic waveform with ¼ period extending between the first and second gain peaks.

4. An apparatus as in claim 3, wherein the second transparency characteristic is a periodic waveform with one period extending between the first and second gain peaks.

5. An apparatus as in claim 2, wherein:

the first transparency characteristic is a periodic waveform with ¼ period extending between the first and second gain peaks, the second transparency characteristic is a periodic waveform with one period extending between the first and second gain peaks, and the third transparency characteristic is a periodic waveform with two periods extending between the first and second gain peaks.

6. An apparatus as in claim 1, wherein the second transparency characteristic is a periodic waveform having a period equal to $1/(2^n)$ of the period of the waveform of the first transparency characteristic, where n is an integer.

7. An apparatus as in claim 1, wherein the second transparency characteristic is a periodic waveform having a period equal to ½ of the period of the waveform of the first transparency characteristic.

8. An apparatus as in claim 7, wherein the gain versus wavelength characteristics of the optical amplifier include a third gain peak between the first and second gain peaks, and the apparatus further comprises:

a third optical filter connected to the optical amplifier and having a third transparency characteristic which is a periodic waveform having a period related to the wavelength difference between the first and second gain peaks and which is equal to ¼ of the period of the waveform of the first transparency characteristic.

9. An apparatus as in claim 1, wherein at least one of the first and second optical filters is a Fabry-Perot etalon filter.

10. An apparatus as in claim 1, wherein:

the optical amplifier amplifies an input signal in accordance with the gain versus wavelength characteristics to produce an output signal, and the first and second optical filters are arranged in series to filter one of the group consisting of the input signal and the output signal.

11. An apparatus as in claim 8, wherein:

the optical amplifier amplifies an input signal in accordance with the gain versus wavelength characteristics to produce an output signal, and the first, second and third optical filters are arranged in series to filter one of the group consisting of the input signal and the output signal.

12. An apparatus as in claim 6, further comprising:

a branching device which branches an optical signal into a first signal and a second signal, the first and second optical filters being in parallel and the first signal being filtered by the first optical filter and the second signal being filtered by the second optical filter; and a combining device which combines the filtered first and second signals into a combined signal which is amplified by the optical amplifier.

13. An apparatus as in claim 12, the gain versus wavelength characteristics of the optical amplifier including a third gain peak between the first and second gain peaks, and the apparatus further comprises:

a third optical filter having a third transparency characteristic which is a periodic waveform having a period related to the wavelength difference between the first and second gain peaks and which is equal to ¼ of the period of the waveform of the first transparency characteristic, wherein the branching device branches the optical signal into the first signal, the second signal and a third signal, the first, second and third optical filters are in parallel and the third signal is filtered by the third optical filter, and the combining device combines the filtered first, second and third signals into the combined signal.

14. An apparatus as in claim 6, the optical amplifier amplifying an input signal to produce and output signal and the apparatus further comprises:

a branching device which branches the output signal into a first signal and a second signal, the first and second optical filters being in parallel and the first signal being filtered by the first optical filter and the second signal being filtered by the second optical filter, and a combining device which combines the filtered first and second signals into a combined signal.

15. An apparatus as in claim 14, the gain versus wavelength characteristics of the optical amplifier including a third gain peak between the first and second gain peaks, and the apparatus further comprises:

a third optical filter having a third transparency characteristic which is a periodic waveform having a period related to the wavelength difference between the first and second gain peaks and which is equal to ¼ of the period of the waveform of the first transparency characteristic, wherein the branching device branches the output signal into the first signal, the second signal and a third signal, the first, second and third optical filters are in parallel and the third signal is filtered by the third optical filter, and the combining device combines the filtered first, second and third signals into the combined signal.

16. An apparatus as in claim 14, further comprising:

a first phase adjuster which adjusts the phase of filtered first signal before the filtered first and second signals are combined; and a second phase adjuster which adjusts the phase of filtered second signal before the filtered first and second signals are combined.

17. An apparatus as in claim 1, further comprising:

an optical attenuator which attenuates at least one of the first and second gain peaks.

18. An apparatus as in claim 17, wherein the optical attenuator is a notch filter.

19. An apparatus as in claim 1, further comprising:

a controller which controls the first optical filter to adjust at least one of the group consisting of period, phase and attenuation degree, of the waveform of the first transparency characteristic, and controls the second optical filter to adjust at least one of the group consisting of period, phase and attenuation degree, of the waveform of the second transparency characteristic.

20. An apparatus as in claim 1, wherein:

the optical amplifier amplifies an input signal to produce and output signal, one of the first and second optical filters receives and filters the input signal, and the other of the first and second optical filters receives and filters the output signal.

21. An apparatus as in claim 1, wherein:

the optical amplifier amplifies an input signal in accordance with the gain versus wavelength characteristics to produce an output signal, and the first and second optical filters both filter a same one of the group consisting of the input signal and the output signal.

22. An optical communication system comprising:

an optical amplifier with gain versus wavelength characteristics having first and second gain peaks in a wavelength band and a wavelength difference between the first and second gain peaks, the optical amplifier amplifying an input signal in accordance with the gain versus wavelength characteristics to produce an output signal; and first and second optical filters having first and second transparency characteristics, respectively, the first and second transparency characteristics being periodic waveforms having periods related to the wavelength difference between the first and second gain peaks, the period of the waveform of the first transparency characteristic being different from the period of the waveform of the second transparency characteristic, the first and second optical filters each filtering one of the group consisting of the input signal and the output signal.

23. An optical communication system as in claim 22, wherein the second transparency characteristic is a periodic waveform having a period equal to $1/(2^n)$ of the period of the waveform of the first transparency characteristic, wherein n is an integer.

24. An optical communication system as in claim 23, wherein the first and second optical filters are in series.

25. An optical communication system as in claim 23, wherein
  one of the first and second optical filters receives and filters the input signal, and
  the other of the first and second optical filters receives and filters the output signal.

26. An optical communication system as in claim 22, wherein the gain versus wavelength characteristics of the optical amplifier include a third gain peak between the first and second gain peaks, and the optical communication system further comprises:
  a third optical filter filtering one of the group consisting of the input signal and the output signal, the third optical filter having a third transparency characteristic which is a periodic waveform having a period related to the wavelength difference between the first and second gain peaks, the period of the waveform of the third transparency characteristic being different from the periods of the waveforms of the first and second transparency characteristics.

27. An optical communication system as in claim 26, wherein
  the second transparency characteristic is a periodic waveform having a period equal to $1/(2^n)$ of the period of the waveform of the first transparency characteristic, wherein n is an integer, and
  the third transparency characteristic is a periodic waveform having a period equal to ¼ of the period of the waveform of the first transparency characteristic.

28. An optical communication system as in claim 22, further comprising:
  a branching device which branches the input signal into a first signal and a second signal, the first and second optical filters being in parallel and the first signal being filtered by the first optical filter and the second signal being filtered by the second optical filter, and
  a combining device which combines the filtered first and second signals into a combined signal which is provided to the optical amplifier for amplification by the optical amplifier.

29. An optical communication system as in claim 22, further comprising:
  a branching device which branches the output signal into a first signal and a second signal, the first and second optical filters being in parallel and the first signal being filtered by the first optical filter and the second signal being filtered by the second optical filter, and
  a combining device which combines the filtered first and second signals into a combined signal.

30. An optical communication system as in claim 22, further comprising:
  a controller which
    controls the first optical filter to adjust at least one of the group consisting of period, phase and attenuation degree, of the waveform of the first transparency characteristic, and
    controls the second optical filter to adjust at least one of the group consisting of period, phase and attenuation degree, of the waveform of the second transparency characteristic.

31. An apparatus for equalizing gain versus wavelength characteristics of an optical amplifier, the gain versus wavelength characteristics having first, second and third gain peaks in a wavelength band with the second gain peak being between the first and third gain peaks and a wavelength difference between the first and third gain peaks, the optical amplifier amplifying an input signal in accordance with the gain versus wavelength characteristics to produce an output signal, the apparatus comprising:
  first, second and third optical filters having first, second and third transparency characteristics, respectively, wherein
    the first, second and third transparency characteristics are periodic waveforms having different periods related to the wavelength difference between the first and second gain peaks,
    the second transparency characteristic is a periodic waveform having a period equal to $1/(2^n)$ of the period of the waveform of the first transparency characteristic, wherein n is an interger, and
    the third transparency characteristic is a periodic waveform having a period equal to ¼ of the period of the waveform of the first transparency characteristic.

32. An optical communication system comprising:
  a branching device which branches an optical signal into first and second signals;
  a first optical amplifier which amplifies the first signal;
  a first optical filter which filters one of the group consisting of the first signal before being amplified by the first optical amplifier and the first signal after being amplified by the first optical amplifier;
  a second optical amplifier which amplifies the second signal;
  a second optical filter which filters one of the group consisting of the second signal before being amplified by the second optical amplifier and the second signal after being amplified by the second optical amplifier; and
  a combining device which combines the amplified, filtered first and second signals into a combined signal, wherein
    the first and second optical amplifiers have substantially the same gain versus wavelength characteristics, the gain versus wavelength characteristics having first and second gain peaks in a wavelength band with a wavelength difference between the first and second gain peaks, and
  the first and second optical filters have first and second transparency characteristics, respectively, the first and second transparency characteristics being periodic waveforms having periods related to the wavelength difference between the first and second gain peaks, the period of the waveform of the first transparency characteristic being different from the period of the waveform of the second transparency characteristic.

33. An optical communication system as in claim 32, wherein the second transparency characteristic is a periodic waveform having a period equal to ½ of the period of the waveform of the first transparency characteristic.

34. An optical communication system as in claim 32, wherein
the branching device branches the optical signal into the first signal, the second signal and a third signal,
the optical communication system further comprises
a third optical amplifier which amplifies the third signal and has substantially the same gain versus wavelength characteristics as the first and second optical amplifiers, and
a third optical filter having third transparency characteristics and which filters one of the group consisting of the third signal before being amplified by the third optical amplifier and the third signal after being amplified by the third optical amplifier,
the combining device combines the amplified, filtered first, second and third signals into the combined signal, and
the third transparency characteristic is a periodic waveform having a period related to the wavelength difference between the first and second gain peaks and which is different from the period of the waveforms of the first and second transparency characteristics.

35. An optical communication system as in claim 34, wherein the second transparency characteristic is a periodic waveform having a period equal to ½ of the period of the waveform of the first transparency characteristic, and the third transparency characteristic is a periodic waveform having a period equal to ¼ of the period of the waveform of the first transparency characteristic.

36. A method for equalizing gain versus wavelength characteristics of an optical amplifier which amplifies an input signal in accordance with the gain versus wavelength characteristics to produce an output signal, the gain versus wavelength characteristics having first and second gain peaks in a wavelength band with a wavelength difference between the first and second gain peaks, the method comprising the steps of:
filtering one of the group consisting of the input signal and the output signal with a first transparency characteristic; and
filtering one of the group consisting of the input signal and the output signal with a second transparency characteristic, wherein the first and second transparency characteristics are periodic waveforms having periods related to the wavelength difference between the first and second gain peaks, the period of the waveform of the first transparency characteristic being different from the period of the waveform of the second transparency characteristic.

37. A method as in claim 36, wherein the gain versus wavelength characteristics of the optical amplifier include a third gain peak between the first and second gain peaks, and the method further comprises the step of:
filtering one of the group consisting of the input signal and the output signal with a third transparency characteristic which is a periodic waveform having a period related to the wavelength difference between the first and second gain peaks, the period of the waveform of the third transparency characteristic being different from the periods of the waveforms of the first and second transparency characteristics.

38. A method as in claim 37, wherein:
the first transparency characteristic is a periodic waveform with ¼ period extending between the first and second gain peaks,
the second transparency characteristic is a periodic waveform with one period extending between the first and second gain peaks, and
the third transparency characteristic is a periodic waveform with two periods extending between the first and second gain peaks.

39. A method as in claim 36, wherein the second transparency characteristic is a periodic waveform having a period equal to $1/(2^n)$ of the period of the waveform of the first transparency characteristic, wherein n is an integer.

40. A method for equalizing gain versus wavelength characteristics of an optical amplifier, the gain versus wavelength characteristics having first and second gain peaks in a wavelength band with a wavelength difference between the first and second gain peaks, the method comprising the steps of:
branching a light signal into first and second signals;
filtering the first signal with a first transparency characteristic;
filtering the second signal with a second transparency characteristic; and
combining the first and second signals into a combined signal which is amplified by the optical amplifier, wherein the first and second transparency characteristics are periodic waveforms having periods related to the wavelength difference between the first and second gain peaks, the period of the waveform of the first transparency characteristic being different from the period of the waveform of the second transparency characteristic.

41. A method for equalizing gain versus wavelength characteristics of an optical amplifier which amplifies an input signal in accordance with the gain versus wavelength characteristics to produce an output signal, the gain versus wavelength characteristics having first and second gain peaks in a wavelength band with a wavelength difference between the first and second gain peaks, the method comprising the steps of:
branching the output signal into first and second signals;
filtering the first signal with a first transparency characteristic;
filtering the second signal with a second transparency characteristic; and
combining the first and second signals into a combined signal, wherein the first and second transparency characteristics are periodic waveforms having periods related to the wavelength difference between the first and second gain peaks, the period of the waveform of the first transparency characteristic being different from the period of the waveform of the second transparency characteristic.

42. A communication system which connects an optical sending station to an optical receiving station so that an optical signal sent by the optical sending station is received by the optical receiving station, the communication system comprising:
a plurality of optical amplifiers which each amplify the optical signal sent by the optical sending station before being received by the optical receiving station, the plurality of optical amplifiers having a combined gain versus wavelength characteristic with first and second gain peaks in a wavelength band and a wavelength difference between the first and second gain peaks; and a plurality of filters which filter the optical signal sent by the optical sending station before being received by the optical receiving station, each filter having a transparency characteristic which is a periodic waveform having a period related to the wavelength difference between the first and second gain peaks.

43. A communication system which connects an optical sending station to an optical receiving station so that an optical signal sent by the optical sending station is received by the optical receiving station, the communication system comprising:

a plurality of optical amplifiers which each amplify the optical signal sent by the optical sending station before being received by the optical receiving station, the plurality of optical amplifiers having a combined gain versus wavelength characteristic with first and second gain peaks in a wavelength band and a wavelength difference between the first and second gain peaks; and a plurality of optical equalizers which each include a plurality of filters to filter the optical signal sent by the optical sending station before being received by the optical receiving station, each filter having a transparency characteristic which is a periodic waveform having a period related to the wavelength difference between the first and second gain peaks.

44. A communication system as in claim 43, wherein the plurality of filters of each optical equalizer are connected in series.

45. A communication system as in claim 43, wherein the plurality of filters of each optical equalizer are connected in parallel.

46. An apparatus for equalizing gain versus wavelength characteristics of an optical amplifier, the gain versus wavelength characteristics having first and second gain peaks in a wavelength band with a wavelength difference between the first and second gain peaks, the apparatus comprising:

first and second optical filters having first and second transparency characteristics, respectively, the first and second transparency characteristics being periodic waveforms having periods related to the wavelength difference between the first and second gain peaks, the period of the waveform of the first transparency characteristic being different from the period of the waveform of the second transparency characteristic.

47. An apparatus for equalizing gain versus wavelength characteristics of an optical amplifier, the gain versus wavelength characteristics having first and second gain peaks in a wavelength band with a wavelength difference between the first and second gain peaks, the apparatus comprising:

an equalizer having transparency characteristics for equalizing the gain versus wavelength characteristics of the optical amplifier, the transparency characteristics combining, in parallel, a periodic transparency characteristic with at least one other periodically different transparency characteristic.

48. An optical communication system comprising:

an optical amplifier having first and second gain peaks in a wavelength band with a wavelength difference between the first and second gain peaks; and an equalizer connected to the optical amplifier and having transparency characteristics for equalizing the gain versus wavelength characteristics of the optical amplifier, wherein the transparency characteristics combine, in parallel, a periodic transparency characteristic with at least one other periodically different transparency characteristic.

49. A method for equalizing gain versus wavelength characteristics of an optical amplifier, the gain versus wavelength characteristics having first and second gain peaks in a wavelength band with a wavelength difference between the first and second gain peaks, the method comprising:

making transparency characteristics by combining, in parallel, a periodic transparency characteristic with at least one other periodically different transparency characteristic; and equalizing the gain versus wavelength characteristics of the optical amplifier using the made transparency characteristics.

50. An apparatus for equalizing gain versus wavelength characteristics of an optical amplifier, the apparatus comprising:

an equalizer having transparency characteristics for equalizing the gain versus wavelength characteristics of the optical amplifier, the transparency characteristics combining, in parallel, a periodic transparency characteristic with another periodically different transparency characteristic.

51. A method for equalizing gain versus wavelength characteristics of an optical amplifier, the method comprising:

making transparency characteristics by combining, in parallel, a periodic transparency characteristic with another periodically different transparency characteristic; and equalizing the gain versus wavelength characteristics of the optical amplifier using the made transparency characteristics.

52. An apparatus for equalizing gain versus wavelength characteristics of an optical amplifier, the gain versus wavelength characteristics having first and second gain peaks in a wavelength band with a wavelength difference between the first and second gain peaks, the apparatus comprising:

first and second optical filters having first and second transparency characteristics, respectively, the first and second transparency characteristics being periodic waveforms with different periods which combine, in parallel, to provide a combined transparency characteristic which is substantially reverse to the gain versus wavelength characteristics of the optical amplifier, for equalizing the gain versus wavelength characteristics.

53. An apparatus for equalizing gain versus wavelength characteristics of an optical amplifier, the apparatus comprising:

first and second optical filters having first and second transparency characteristics, respectively, the first and second transparency characteristics being periodic waveforms with different periods related to the gain versus wavelength characteristics of the optical amplifier and which combine, in parallel, to provide a combined transparency characteristic which is substantially reverse to the gain versus wavelength characteristics of the optical amplifier, for equalizing the gain versus wavelength characteristics.

54. An apparatus for equalizing gain versus wavelength characteristics of an optical amplifier, the apparatus comprising:

optical filters having respectively corresponding transparency characteristics with periods which are different from each other and related to the gain versus wavelength characteristics of the optical amplifier, the transparency characteristics of the optical filters combining together, in parallel, to provide a combined transparency characteristic which is substantially reverse to the gain versus wavelength characteristics of the optical amplifier, for equalizing the gain versus wavelength characteristics.

55. An apparatus for equalizing gain versus wavelength characteristics of an optical amplifier which amplifies a light, the apparatus comprising:

a phase shifter shifting a phase of a portion of the light, to provide at least two different light portions of the light, the portions of the light being combined, wherein wavelength characteristics of the combined portions equalize the gain versus wavelength characteristics of the optical amplifier.

56. An apparatus as in claim 55, wherein the phase shifter has a plurality of periodic wavelength characteristics with periods related to the gain versus wavelength characteristics of the optical amplifier.

* * * * *

UNITED STATES PATENT AND TRADEMARK OFFICE
CERTIFICATE OF CORRECTION

PATENT NO.   : 6,344,914 B1
DATED        : February 5, 2002
INVENTOR(S)  : Naomasa Shimojoh et al.

It is certified that error appears in the above-identified patent and that said Letters Patent is hereby corrected as shown below:

<u>Title page,</u>
Item [56], References Cited, OTHER PUBLICATIONS, insert the following references:
-- Takeda, et al., *"Gain equalization of Erdoped fiber amplifier using etalon filter"*, a publication of autumn communication society by the Institute of Electronics, Information and Communication Engineers, B-759, 1995 (Japanese language).

N.S. Bergano et al., *"100/Gb/s WDM Transmission of Twenty 5Gb/s NRZ Data Channels Over Transoceanic Distances Using a Gain Flattened Amplifier Chain"*, Th. A. 1, ECOC'95.

Kazuhiro Oda et al., *"16-Channel x 10-Gbit/s Optical FDM Transmission Over a 1000 km Conventional Single-Mode Fiber Employing Dispersion-Compensating Fiber and Gain Equalization"*, OFC'95, PD22-1 to PD22-5. --

Signed and Sealed this

Fifteenth Day of October, 2002

Attest:

Attesting Officer

JAMES E. ROGAN
Director of the United States Patent and Trademark Office